(12) United States Patent
Reynolds et al.

(10) Patent No.: US 9,707,881 B2
(45) Date of Patent: Jul. 18, 2017

(54) BAFFLED FLUID TANK WITH STAIRWAY ACCESS

(71) Applicant: Western Technology Services International, Inc., Casper, WY (US)

(72) Inventors: Frederick J. Reynolds, Casper, WY (US); Scott Taylor, Bar Nunn, WY (US)

(73) Assignee: Western Technology Services International, Inc., Mills, WY (US)

( * ) Notice: Subject to any disclaimer, the term of this patent is extended or adjusted under 35 U.S.C. 154(b) by 408 days.

(21) Appl. No.: 14/345,726

(22) PCT Filed: Dec. 7, 2012

(86) PCT No.: PCT/US2012/068487
§ 371 (c)(1),
(2) Date: Mar. 19, 2014

(87) PCT Pub. No.: WO2013/095954
PCT Pub. Date: Jun. 27, 2013

(65) Prior Publication Data
US 2014/0217716 A1    Aug. 7, 2014

Related U.S. Application Data

(60) Provisional application No. 61/579,543, filed on Dec. 22, 2011.

(51) Int. Cl.
*B60P 3/22* (2006.01)
*B62D 33/04* (2006.01)
(Continued)

(52) U.S. Cl.
CPC ............. *B60P 3/2235* (2013.01); *B60P 3/226* (2013.01); *B62D 33/042* (2013.01);
(Continued)

(58) Field of Classification Search
CPC .................. B60P 3/2235; B60P 3/226; B65D 2590/0075; B65D 90/52;
(Continued)

(56) References Cited

U.S. PATENT DOCUMENTS 1,963,815 A * 6/1934 Warfield .................... A63J 5/00
472/82
2,134,678 A * 10/1938 Billig ..................... B64D 37/02
220/563
(Continued)

*Primary Examiner* — Jeffrey Allen
*Assistant Examiner* — Jennifer Castriotta
(74) *Attorney, Agent, or Firm* — ColterJennings

(57) ABSTRACT

A tank for transporting fluids on a truck chassis includes a front wall, side walls, a back wall, a top, and a floor. Interior stairs extend from the floor to an opening in the top to allow stair access into the interior with integrated safety handrails on the fill port cover. Stair toe kicks act as internal transverse baffles to help control fluid motion and surging. The stairs also act as a structural stiffener between longitudinal baffles. Horizontal baffles assist in controlling fluid motion and surging. Formed baffles provide strength and stiffness. A baffle interlocking system improves joint integrity and aids manufacturing. Formed outer skins provide structural strength for the tank. Ports located in front and rear bulkheads may be used for tank ventilation or, depending on local safety codes, as secondary access points.

57 Claims, 39 Drawing Sheets

(51) Int. Cl.
    *B65D 88/12*           (2006.01)
    *B65D 90/52*           (2006.01)
    *B60K 15/077*          (2006.01)
    *B60K 15/03*            (2006.01)

(52) U.S. Cl.
    CPC .......... *B65D 88/128* (2013.01); *B65D 90/52* (2013.01); *B60K 15/077* (2013.01); *B60K 2015/0344* (2013.01); *B60K 2015/0775* (2013.01); *B60K 2015/0777* (2013.01); *B65D 2590/0091* (2013.01)

(58) Field of Classification Search
    CPC ......... B65D 2590/0091; B60K 15/077; B60K 2015/0775; B60K 2015/0777; B60K 2015/0344; B62D 33/042
    USPC ......... 280/838, 830; 182/187; 220/1.5, 562, 220/563, DIG. 24, 4.12, 501; 137/574, 137/576
    See application file for complete search history.

(56) References Cited

U.S. PATENT DOCUMENTS

| | | | | |
|---|---|---|---|---|
| 3,131,949 A * | 5/1964 | Black | ............... | B21D 51/00 220/560.04 |
| 3,799,383 A * | 3/1974 | Gerhard | ............... | B65D 88/128 220/1.5 |
| 3,979,005 A * | 9/1976 | Robinson | ............... | B64D 37/06 206/521 |
| 4,251,005 A * | 2/1981 | Sons | ............... | B65D 88/06 105/360 |
| 4,313,566 A * | 2/1982 | Klein | ............... | A01G 25/09 137/255 |
| 4,611,724 A * | 9/1986 | Watkins | ............... | B60P 3/221 220/553 |
| 5,653,469 A * | 8/1997 | Wade | ............... | B60P 3/2205 220/562 |
| 5,779,092 A * | 7/1998 | Hehn | ............... | B60P 3/224 137/574 |
| 6,367,648 B1 * | 4/2002 | Boone, Jr. | ............... | A62C 27/00 220/563 |
| 6,385,920 B1 * | 5/2002 | Chandler | ............... | E04H 9/12 52/169.6 |
| 7,735,507 B2 * | 6/2010 | Hagenbuch | ............... | B60P 3/2235 137/15.08 |
| 9,061,623 B2 * | 6/2015 | MacLean | ............... | B60P 3/2235 |
| 2002/0179611 A1 * | 12/2002 | Hagenbuch | ............... | B60P 3/2235 220/563 |
| 2005/0189358 A2 * | 9/2005 | Hagenbuch | ............... | B60P 3/2235 220/563 |
| 2010/0032435 A1 * | 2/2010 | Satterfield | ............... | B60P 3/221 220/562 |
| 2010/0243651 A1 * | 9/2010 | Hagenbuch | ............... | B60P 3/2235 220/86.1 |
| 2013/0112768 A1 * | 5/2013 | Hagenbuch | ............... | B60P 3/2235 239/11 |
| 2014/0353308 A1 * | 12/2014 | MacLean | ............... | B60P 3/2235 220/1.5 |
| 2014/0361019 A1 * | 12/2014 | Caroleo | ............... | B60P 3/24 220/562 |

* cited by examiner

| TANK COMPARISON | | |
|---|---|---|
| | FLUID MOTION TRANSVERSE EXCITATION | |
| Time (sec) | Baseline Tank Moment (in-lbs) | New Tank Moment (in-lbs) |
| 0.1 | -1,090,000 | -202,000 |
| 0.5 | -2,080,000 | -1,250,000 |
| 1.0 | -4,170,000 | -2,670,000 |
| 1.5 | -5,140,000 | -3,680,000 |
| 1.6 | -5,160,000 | -3,810,000 |
| 2.0 | -4,720,000 | -4,170,000 |
| 2.1 | -4,510,000 | -4,210,000 |
| 2.5 | -3,310,000 | -4,020,000 |
| 3.0 | -1,890,000 | -2,880,000 |
| 3.5 | -348,000 | -977,000 |
| 4.0 | 1,220,000 | 826,000 |
| 4.5 | 2,140,000 | 2,060,000 |
| 4.7 | 2,260,000 | 2,330,000 |
| 5.0 | 2,120,000 | 2,550,000 |
| 5.2 | 1,850,000 | 2,580,000 |
| 5.5 | 1,350,000 | 2,460,000 |
| 6.0 | 185,000 | 1,730,000 |
| 6.5 | -751,000 | 927,000 |
| 7.0 | -670,000 | 798,000 |
| 7.5 | -125,000 | 667,000 |
| 8.0 | -27,300 | 427,000 |

FIGURE 20

| TANK COMPARISON |||
|---|---|---|
| FLUID MOTION LONGITUDINAL EXCITATION |||
| Time (sec) | Baseline Tank Moment (in-lbs) | New Tank Moment (in-lbs) |
| 0.1 | 36,585,700 | 36,853,800 |
| 0.5 | 37,068,700 | 37,351,100 |
| 1.0 | 37,924,400 | 38,073,300 |
| 1.5 | 38,497,600 | 38,475,400 |
| 1.8 | 38,642,100 | 38,539,000 |
| 2.0 | 38,658,300 | 38,514,400 |
| 2.5 | 38,494,000 | 38,233,900 |
| 3.0 | 38,053,300 | 37,635,000 |
| 3.5 | 37,287,500 | 36,855,300 |
| 4.0 | 36,377,200 | 36,116,900 |
| 4.5 | 35,655,300 | 35,625,300 |
| 5.0 | 35,285,100 | 35,444,700 |
| 5.3 | 35,216,200 | 35,515,900 |
| 5.5 | 35,236,100 | 35,637,300 |
| 6.0 | 35,538,200 | 36,160,300 |
| 6.5 | 35,915,200 | 36,672,000 |
| 7.0 | 35,933,800 | 36,743,600 |
| 7.5 | 35,872,600 | 36,702,200 |
| 8.0 | 36,072,700 | 36,725,100 |

FIGURE 31

BAFFLED FLUID TANK WITH STAIRWAY ACCESS

CROSS-REFERENCE TO RELATED APPLICATION

This application claims priority based on U.S. Provisional Patent Application Ser. No. 61/579,543 filed Dec. 22, 2011 and titled "Baffled Fluid Tank with Stairway Access," the disclosure of which is incorporated herein by this reference.

BACKGROUND

This disclosure relates to an improved tank for transporting fluids, and in particular, to a tank with a wide ingress-egress opening, stairs and horizontal baffles.

Dust control and mitigation is a major concern for many industries. For example, in the mining industry, the general construction industry and the highway construction industry, dust poses potential safety and health issues at the work site and the surrounding areas. Dust may affect operational safety by reducing visibility and interrupting traffic patterns. Dust may also cause potential environmental issues by adversely affecting air quality, which may lead to long term health issues and may make general working conditions uncomfortable or intolerable.

To address these issues, water from water tanker vehicles is sprayed onto the surface soil to control dust at the site and to prevent dust from drifting to surrounding areas. Safe operation of the water tanker vehicle is of paramount importance and requires a stable tank on the vehicle. A stable tank reduces fluid motion and surging during vehicle acceleration, deceleration, turning, and movement over various surfaces. The tank should control fluid motion at all fluid levels, but in particular at levels less than full, because the fluid tends to move more and exert greater forces on the tank at levels less than full. By controlling fluid motion, the magnitude of the forces and overturning moments imparted to the vehicle by the water tanker are reduced, providing a more stable and safer operating vehicle.

Safe manufacture and maintenance of the tank requires access to the interior of the tank for construction and periodic inspection, cleaning and maintenance. Typically, tank designs and baffle configurations are subject to confined space safety regulations. For example, in the United States, the Occupational Safety & Health Administration ("OSHA") defines a confined space as a space that: (1) is large enough and so configured that an employee can bodily enter and perform work; and (2) has limited or restricted means for entry or exit (for example tanks, vessels, silos, storage bins, hoppers, vaults, and pits are spaces that may have limited means of entry); and (3) is not designed for continuous employee occupancy. Other regulatory guidelines, specifications, and requirements may be applicable depending on the location where manufacturing, operation, and maintenance activities occur.

A permit may be required to enter or perform work in certain types of confined spaces. For example, OSHA defines a permit-required confined space as a confined space that has one or more of the following characteristics: (1) contains or has the potential to contain a hazardous atmosphere; (2) contains a material that has the potential for engulfing an entrant; (3) has an internal configuration where an entrant may become trapped or asphyxiated by inwardly converging walls or by a floor that slopes downward and tapers to a smaller cross-section; or (4) contains any other recognized serious safety or health hazard. Only specially trained personnel are allowed to enter a permit-required confined space for any purpose and they may only enter that confined space after receiving approval from an entry supervisor. An attendant, trained in entry and rescue procedures, must monitor the entrant at all times when working in permit-required confined spaces. Once inside a permit-required confined space tank, it may be cumbersome and difficult for personnel to maneuver around the internal baffles of the tank, due to the baffle configuration or small access openings in the baffles. As a result, manufacturing and maintaining the tank interior can be a time consuming process with numerous hazards that must be abated.

Performing work in a permit-required confined space is also very expensive due to the additional training, monitoring, personnel, permits and written procedures that are required for such activities to occur. Prior to entering a permit-required confined space, the internal atmosphere must be tested to ensure that conditions are safe for personnel. To mitigate air quality issues and address other potentially hazardous atmospheric conditions within the permit-required confined space, ventilation systems and personal respirators are often utilized. Continuous forced air ventilation may be provided and directed to all areas where personnel are present. It is important that the air supply is from a clean source and that the air supply will not increase any hazards in the permit-required confined space. Thus, existing water tanks that may fall under confined space regulations have numerous shortcomings.

SUMMARY

The present disclosure provides a tank design that overcomes many of the shortfalls of prior designs. The present design includes features such as stair access into the interior from the top of the tank with integrated safety handrails on the fill port cover along with interior design enhancements that reduce the likelihood of the tank being subject to the definition of "confined space" under the regulations. These design features may also reduce the permit-required confined space requirements for permitting, training, monitoring, and other regulatory matters.

Additional design features include horizontal baffles to control fluid motion and surging up the tank side while still providing for direct line of sight corridors when walking inside the tank. Climbing over or crawling on baffles or other supports is not required for internal access. Unlike some prior designs, no internal doors are required on the baffle openings, which may reduce the amount of material needed for construction as well as the weight, cost, maintenance, and safety concerns (such as entrapment and restricted visibility).

Formed baffles (offset & vertical corrugation) provide strength and stiffness while eliminating the need for additional structural support members or stiffeners to be welded to the baffles. An "egg-crated" baffle interlocking system improves joint integrity and aids manufacturing. Formed outer skins provide structural strength for the tank. Ports located in front and rear bulkheads may be used for tank ventilation or, depending on local safety codes, may also be used as secondary access ports. The tank, baffle system, and access system provide a tank for transporting and dispensing fluids that is safer to manufacture, operate, and maintain than prior tanks.

The internal baffle system has longitudinal, transverse, and horizontal baffles to control fluid motion and surging while the tanker vehicle is in operation. The shape of the baffles increases strength, which reduces or eliminates the need to weld additional structural support members or stiffeners to the baffles. An interlocking system joins the longitudinal and transverse baffles. This interlocking system utilizes offsetting slots in the baffles to allow the baffles to be nested or "egg-crated" together, thereby streamlining the manufacturing process. By interlocking the baffles, the integrity of the baffle joints is also not entirely dependent on the weld as the interlocked baffles will tend to remain joined.

The baffle system also provides structural support for the tank and stair access system, controls fluid surge and undesirable fluid motion, and provides personnel unrestricted access to the various compartments created by the baffle system. By strategically locating the baffles, the baffle system reduces fluid surge up the sides of the tank without the need for doors or coverings on the baffle access openings. Material requirements, tank weight, cost and maintenance issues may be reduced by eliminating the doors and coverings on the baffle access openings.

The door-less baffle system may also offer the added benefit of being inherently safer as there are no doors or coverings to accidentally close, thereby entrapping personnel. The baffle system and baffle openings are arranged and sized in such a manner as to provide a direct line of sight with unimpeded straight lines for personnel movement within the tank, thereby eliminating the "maze" effect associated with some baffle systems. The control of fluid motion with the baffle system provides a stable operating tanker system that reduces the chance of the vehicle over turning and increases operational safety.

The tank also incorporates an access system, comprised of stairs descending from the top of the tank to the interior floor of the tank, appropriate stair handrails, safety guardrails incorporated into the fill port access cover to prevent falling into the stair opening, a safety walkway, guardrails on the top of the tank leading to the stair opening, and ventilation ports located in the front and rear bulkheads. Depending on local safety codes, the ports may also be used for secondary access into the tank. The stair treads are of open grating construction to promote filling of the tank. The stair riser, or toe kick, is typically solid to structurally support the stair treads and the central longitudinal baffles while acting as transverse baffles to further control fluid motion and surge during vehicle acceleration and deceleration. According to another embodiment, the tank has a stairway affixed to a bulkhead of the tank, with an access door located in the bulkhead at the top of a stairway to allow access to the stairway and thus the interior of the tank. According to yet another embodiment, an access port or door is located in a bulkhead of the tank, in which case a stairway may not be needed, or a removable stairway may be used.

The treads may be constructed from solid material and the risers may be constructed from material with an open profile. Although one embodiment of the present invention utilizes open treads and solid risers, various combinations of solid and open tread and riser material may be used to construct the stairs. The stair access through the tank fill port into the tank interior may also eliminate the confined space designation as the stairs provide an unrestricted means for entry and exit into the tank. Confined space constraints are further mitigated by the size of the baffle openings. The baffle openings are sized so that a person of average size may freely pass through the opening without crawling, climbing, or twisting.

The present design may include a ventilation system comprised of fans attached directly to the ports in the front and rear bulkheads. The ventilation system utilizes the large fill port opening required for the stair access as an air exhaust or an air intake while moving fresh air through the tank. In one direction of operation, the fans pull fresh air from outside the tank in through the ports, circulate it through the tank, and exhaust it out the large fill port in the top of the tank. In the opposite direction of operation, the fans pull fresh air in through the large fill port in the top of the tank, circulate it through the tank, and exhaust it through the opposing ports in the front and rear bulkheads. Additional ventilation ports may also be located in the top of the tank. The fans are typically attached during manufacturing and maintenance, and then removed during actual operation of the tank.

Confined space and atmospheric conditions are major safety concerns for those involved with manufacturing, operating, and maintaining a water tanker. By providing an unrestricted means to enter or exit the tank, the confined space restrictions may be significantly reduced. By providing an adequate ventilation system, air quality and hazardous atmospheric conditions are addressed thus providing a safer working environment. Reducing confined space restrictions may significantly reduce the costs, time, and additional personnel requirements associated with the manufacture and maintenance of the tank. Perhaps most importantly, personnel safety may be greatly improved.

BRIEF DESCRIPTION OF THE DRAWINGS

Other features and advantages of the present invention will be apparent from reference to the following Detailed Description taken in conjunction with the accompanying Drawings, in which:

FIG. 20 depicts a table showing data from CFD simulations comparing fluid motion in the tank depicted in FIG. 1 to a baseline tank under transverse forces;

FIG. 31 depicts a table showing data from CFD simulations comparing fluid motion in the tank depicted in FIG. 1 to a baseline tank under longitudinal forces;

DETAILED DESCRIPTION

Figure 1:
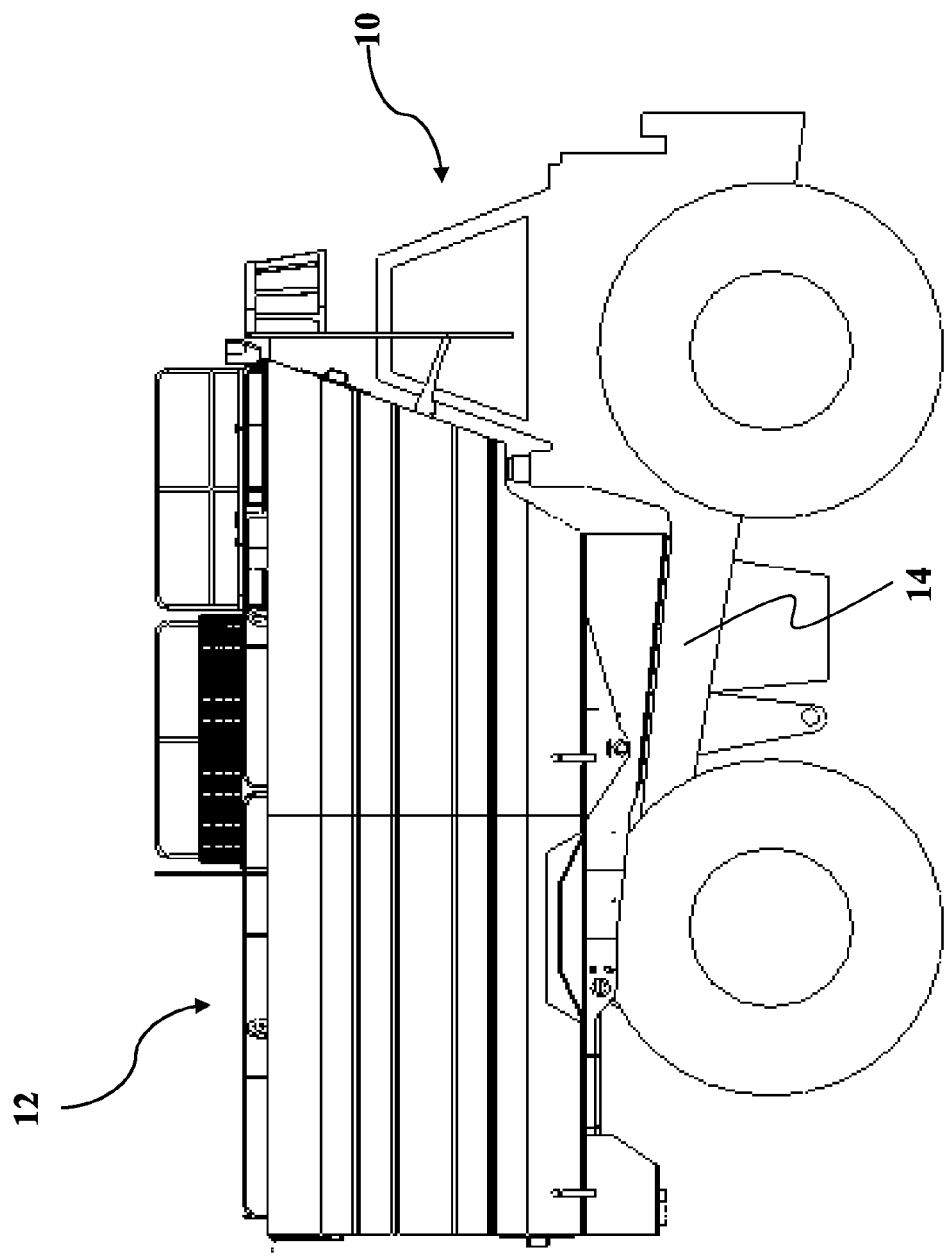
FIG. 1 depicts a side elevation view of a baffled tank with stairway access on a vehicle chassis.

FIG. 1 depicts a representative vehicle 10 for carrying a tank 12 that is constructed according to the present disclosure. The configuration shown is typical of a water tanker truck used in the mining industry for dust suppression and fire control. The vehicle 10 includes a chassis 14 on which the tank 12 is attached. It is also recognized that the tank 12 may be attached to other types of vehicles 10 such as on-highway vehicles, trailers, or the like. Those skilled in the art will appreciate that the tank 12 of the present invention may be constructed with various physical dimensions to accommodate the various sized vehicles 10 on which the tank 12 may be mounted.

Figure 2:
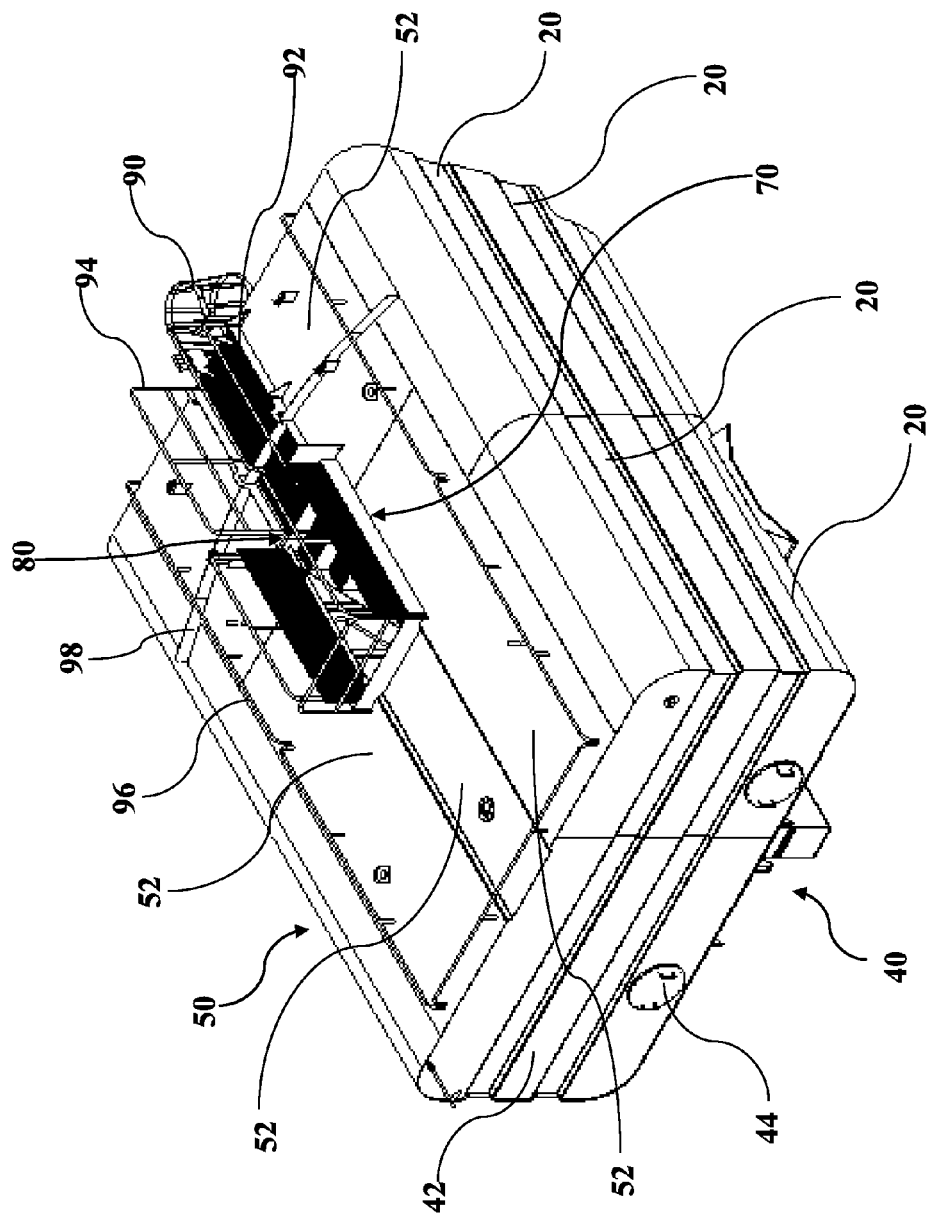
FIG. 2 depicts a rear isometric view of the tank of FIG. 1.
Figure 3:
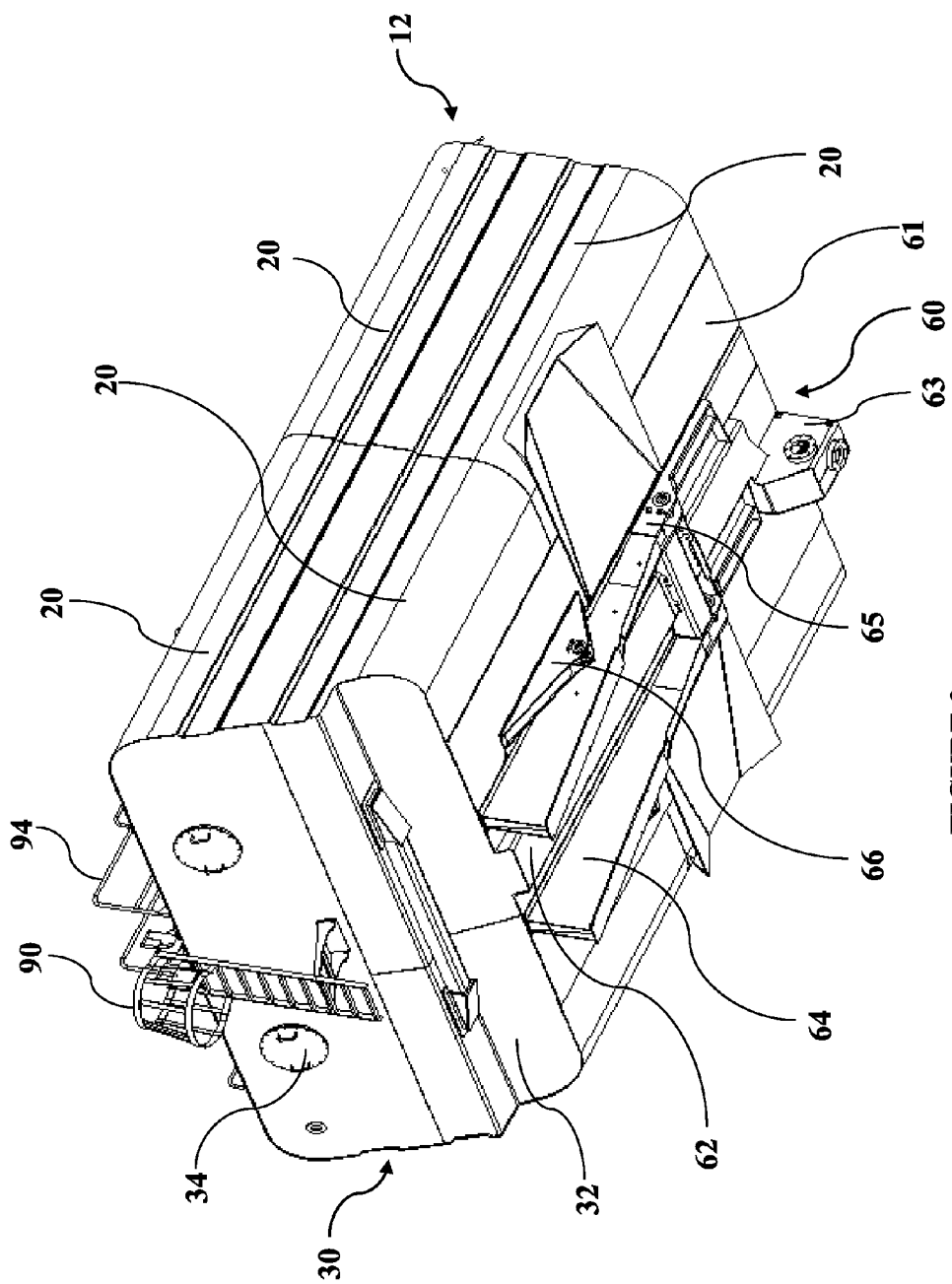
FIG. 3 depicts a front isometric view of the tank of FIG. 1.

FIGS. 2 and 3 depict the exterior components of the tank 12. The tank 12 is comprised of a plurality of side plates 20, a front bulkhead 30, a rear bulkhead 40, a top 50, and a floor 60.

The side plates 20 are formed to increase the strength and stiffness of the tank 12. Typically the side plates 20 are formed with an offset configuration. It will be appreciated that the side plates 20 may be formed with other geometries such as, but not limited to a "V" configuration. The side plates 20 are welded to one another, the front bulkhead 30, the rear bulkhead 40, the top 50, and the floor 60.

The front bulkhead 30 is comprised of at least one plate 32 for smaller tanks 12, a plurality of plates 32 for larger tanks 12, and ventilation ports 34. The front bulkhead 30 is set at an angle to optimize the fit to the vehicle 10. It will be appreciated that the angle of the front bulkhead 30 will vary depending on the vehicle 10 size and class. The ventilation ports 34 provide a means for venting any hazardous fumes created while working inside the tank 12 and for supplying fresh air to personnel working inside the tank 12.

The rear bulkhead 40 comprises at least one plate 42 for smaller tanks 12, a plurality of plates 42 for larger tanks 12, and ventilation ports 44. The plates 42 are formed to increase the strength and stiffness of the tank 12. The ventilation ports 44 provide a means to ventilate the tank 12 with a fresh air supply while venting any hazardous fumes from the tank 12. The ventilation ports 44 may also provide a means to get equipment, tools and materials inside the tank, and depending on local safety codes, may provide a secondary access port into the tank 12.

The top 50 is comprised of a plurality of plates 52 and includes a fill port 70 through which the tank 12 may be filled and through which the tank 12 stairs 80 may be accessed. An external ladder 90 is included to provide access from the vehicle 10 deck to the top 50 of the tank 12. A walkway 92 constructed with non-slip materials with a plurality of safety guardrail 94 is provided between the external ladder 90 and the stairs 80 located in the fill port 70. A plurality of safety rails 96 are also included around the perimeter of the top 50 of the tank 12 to provide a safe working platform for personnel. A water dam 98 is also provided to direct any over-fill or spillage off to the sides of the tank 12 and prevent any fluid from spilling onto the vehicle 10 deck or cab.

The floor 60 is comprised of a plurality of floor plates 61, a sump trough 62, and a sump housing 63 that directs fluid into the pump and spray systems. The floor 60 also includes two rails 64, a pivot module 65, and two lift cylinder brackets 66 to mount the tank 12 to the chassis 14. The rails 64 rest on the chassis 14 and transfer the load, forces, and moments from the tank 12 into the chassis 14. The pivot module 65 allows the tank 12 to be pinned to the chassis 14 and comprises the axis about which the tank 12 will pivot when raised into an upright position. The lift cylinder brackets 66 are connected to the lift cylinders stemming from the chassis 14. The lift cylinders provide the force required to lift the tank 12 into the upright position. Raising the tank 12 allows access to the vehicle 10 drive train, transmission, and other components for service and maintenance operations.

Figure 4:
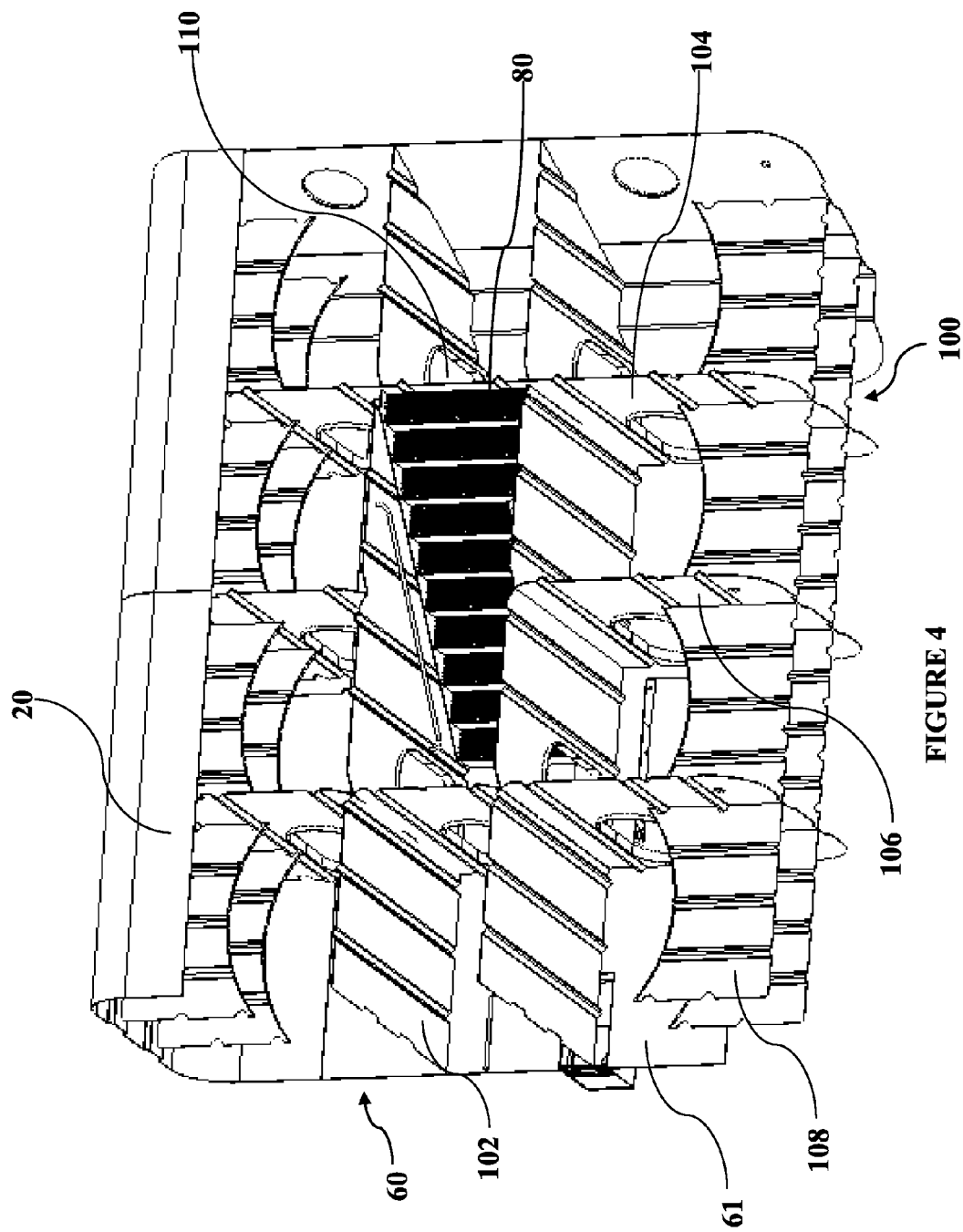
FIG. 4 depicts a cut-away isometric view showing tank, internal baffle system & stair access of the tank of FIG. 1.
Figure 5:
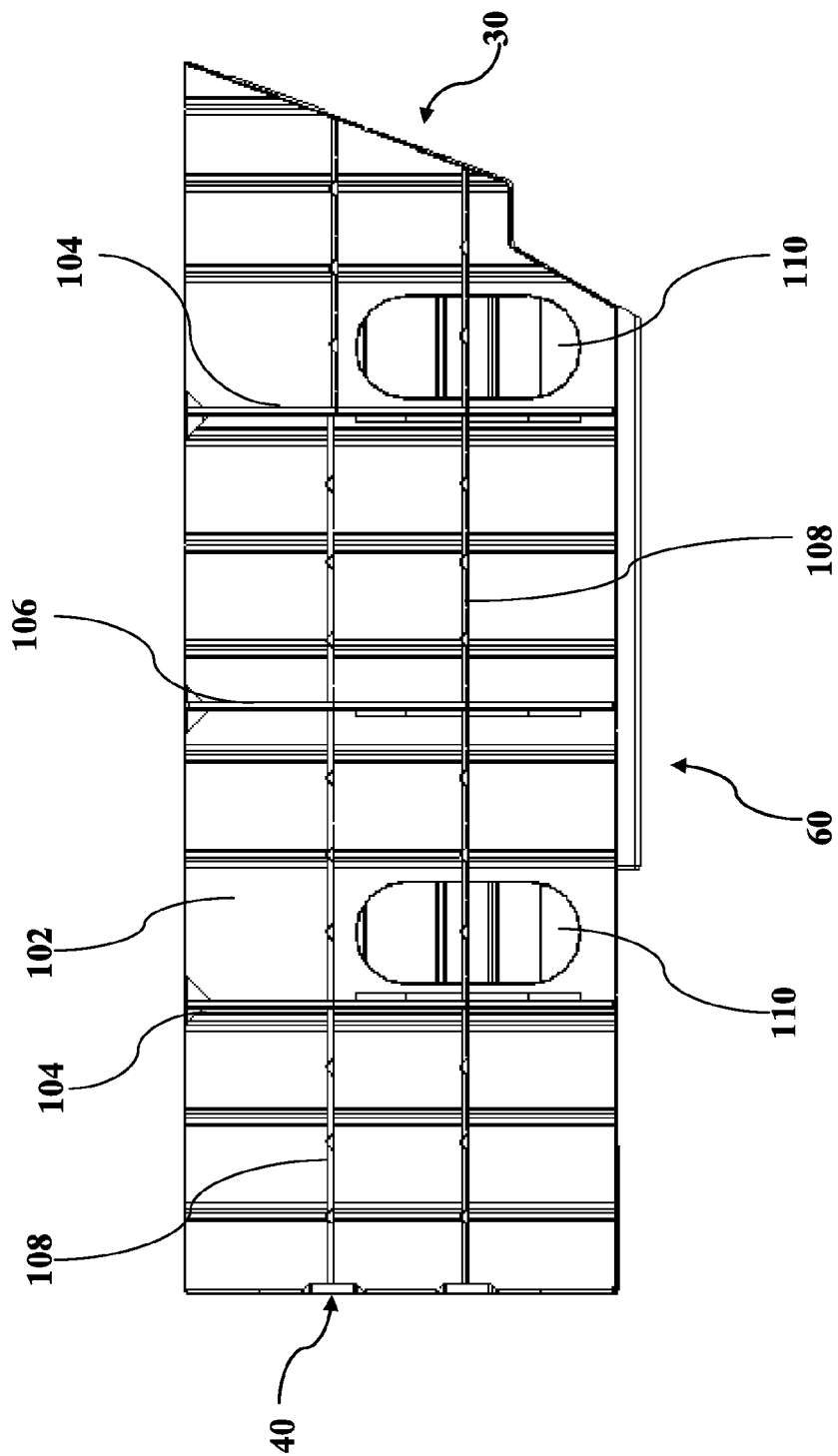
FIG. 5 depicts a side cut-away view showing internal baffle system of the tank of FIG. 1.
Figure 6:
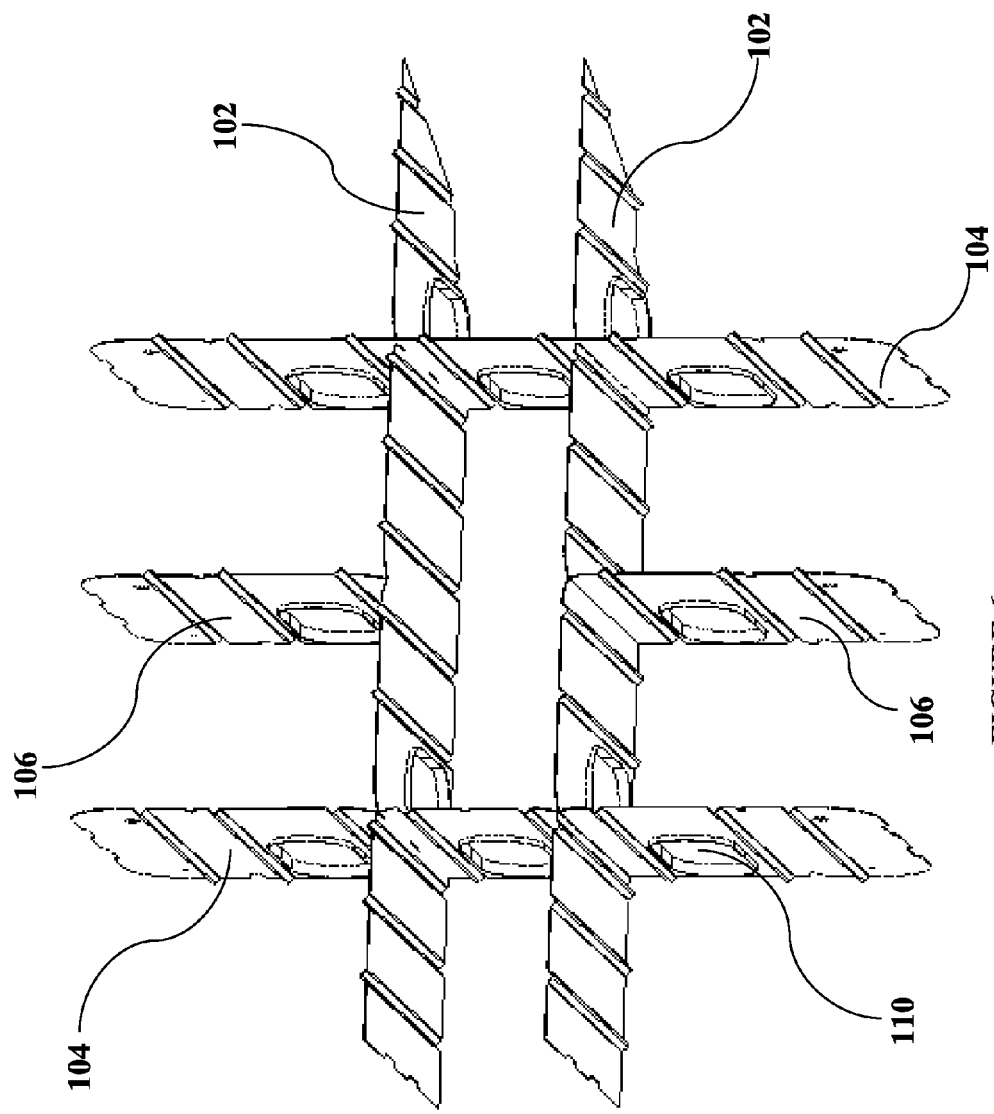
FIG. 6 depicts an isometric view showing internal baffle system of the tank of FIG. 1.

FIGS. 4 and 5 depict an internal baffle system 100 that structurally supports and strengthens the tank 12. In addition to increasing the structural integrity of the tank 12 and mitigating confined space restrictions, the baffle system 100 provides longitudinal, transverse, and torsional structural strength for the tank 12 during operation of the vehicle 10. The baffle system 100 is comprised of a plurality of longitudinal baffles 102, a plurality of transverse baffles 104, a plurality of central transverse baffles 106, and a plurality of horizontal baffles 108. FIG. 6 depicts the interlocking system that joins the longitudinal baffles 102 and the transverse baffles 104 and 106. This interlocking system utilizes offsetting slots in the baffles to allow the baffles to be nested or "egg-crated" together, which aids the manufacturing process. By interlocking the baffles, the integrity of the baffle joints is also enhanced because loads are transferred between the plates in contact and the load path is not entirely dependent on the weld joint.

The baffles 104 may be formed in a variety of ways. For example, the baffles may be angled or corrugated, such as with a "V" or an "offset" configuration, to increase strength and stiffness and to eliminate the need to attach additional structural members to the baffles for reinforcement and stiffening. Eliminating the additional structural members improves reliability and reduces maintenance issues within the tank 12 as well as eliminates the chance of one of these additional members becoming dislodged from a baffle. If these additional members become dislodged from a baffle, the strength of the baffle may be reduced and the structural integrity of the entire tank 12 may be compromised. In addition, the dislodged member may strike the tank 12 interior, possibly causing damage during operation. It will be appreciated that the location of the formed geometries may vary with tank 12 size and that spacing of the formed geometries may vary based on results of stress analyses. For example, additional formed geometries may be added to increase strength in areas of the baffles that exhibit higher stresses due to forces generated by fluid motion.

The longitudinal baffles 102 typically span the full length of the tank 12, joining the front bulkhead 30 and the rear bulkhead 40. The longitudinal baffles 102 also typically span the full height of the tank 12 joining the top 50 and the floor 60. The longitudinal baffles 102 are located in the tank 12 and are typically aligned over the rails 64 to provide an effective and efficient load path in which to transfer forces from the tank 12 to the chassis 14.

The transverse baffles 104 typically span the entire width of the tank 12 joining the side plates 20. The transverse baffles 104 also typically span the entire height of the tank 12 joining the top 50 and the floor 60. The transverse baffles 104 are typically located in front of and behind the stairs 80. The front transverse baffle 104 also provides support for the stairs 80.

The central transverse baffles 106 span from the side plates 20 to the longitudinal baffles 102 and provide support for the stairs 80. The central transverse baffles 106 also span the entire height of the tank 12 joining the top 50 and the floor 60. Baffle openings 110 are provided in the longitudinal baffles 102, the transverse baffles 104, and the central transverse baffles 106 to allow personnel access to the various compartments formed by the baffle system 100.

The horizontal baffles 108 span the length of the compartments formed between the front bulkhead 30, the rear bulkhead 40, the transverse baffles 104, and the central transverse baffles 106 respectively. The horizontal baffles 108 span from the side plates 20 to the baffle openings 110 located in the transverse baffles 104 and the central transverse baffles 106.

Prior water tanks have included sidewall baffles or surge suppressor plates extending into the tank off of the side walls to help contain fluid surge. For example, one prior tank has sidewall baffles or surge suppressor plates that include a first leg extending inwardly at a downward angle from the sidewall of the tank and a second leg extending downward from the end of the first leg. The downward angle of the first leg and the subsequent downward second leg reduce the effective elevation from the tank floor of the sidewall baffles and may actually act as a ramp for the liquid to surge further up the side wall of the tank. The downward second leg of the sidewall baffle becomes nearly perpendicular to the floor of the prior tank.

As fluid flows from side to side in this prior tank, the second leg of the sidewall baffle acts like a flat plate in a fluid flow. The flat plate will cause a separation point in the fluid and will direct fluid flow around the plate. The downward slope of the first leg will tend to act as a ramp and accelerate the flow up the sidewall baffle plate, potentially increasing the fluid surge up the tank side. The sidewall baffles or surge suppressor plates of the prior tank are also relatively small and only extend into the tank a relatively short distance. These relatively small plates and the relatively small area created between the side wall greatly limits the volume of fluid surge that may be contained. Once the fluid fills this small volume, any additional surge will flow over the top of the plate and up the side wall of the tank.

Figure 8:
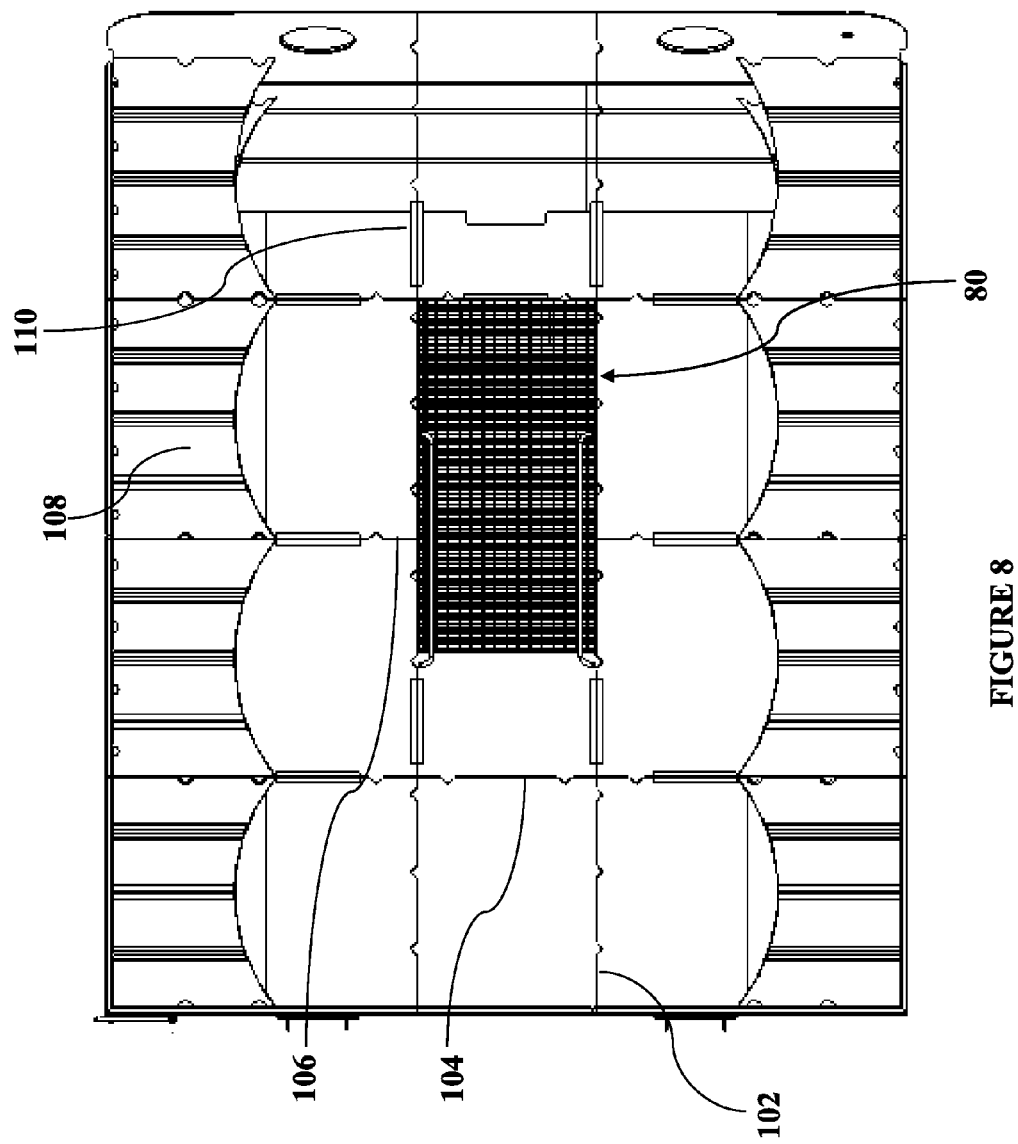
FIG. 8 depicts a top cut-away view showing internal baffle system & stair access of the tank of FIG. 1.

As depicted in FIG. 8, the horizontal baffles 108 of the present water tank extend into the tank 12, creating a larger area between the side plates 20 and the protruding end of the horizontal baffle 108. This increased area allows the horizontal baffles 108 to contain a greater volume of fluid, thereby reducing fluid surge up the sides 20 of the tank 12. The horizontal baffles 108 also maintain a higher effective elevation from the tank floor 60 as they are relatively parallel (form little to no angle) to the floor 60. The relatively parallel horizontal baffles 108 mitigate fluid acceleration over the plate and tend not to increase fluid surge up the side plates 20 of the tank 12. Also, by maintaining a higher effective elevation, the horizontal baffles 108 are more effective at controlling fluid surge up the sides of the tank 12 at higher fluid levels.

The Figures depict two levels of horizontal baffles 108, but fewer or more levels may be used, and the baffles may be pitched from the horizontal, typically pitched downwardly from five to ten degrees. According to other embodiments, the pitch could be up, down, up and down, and could be at a wide variety of angles. The specific design decisions would likely be based on the size of the tank, the proposed operational uses of the tank, manufacturing costs, and the calculated fluid dynamics needed for any given tank design.

Figure 7:
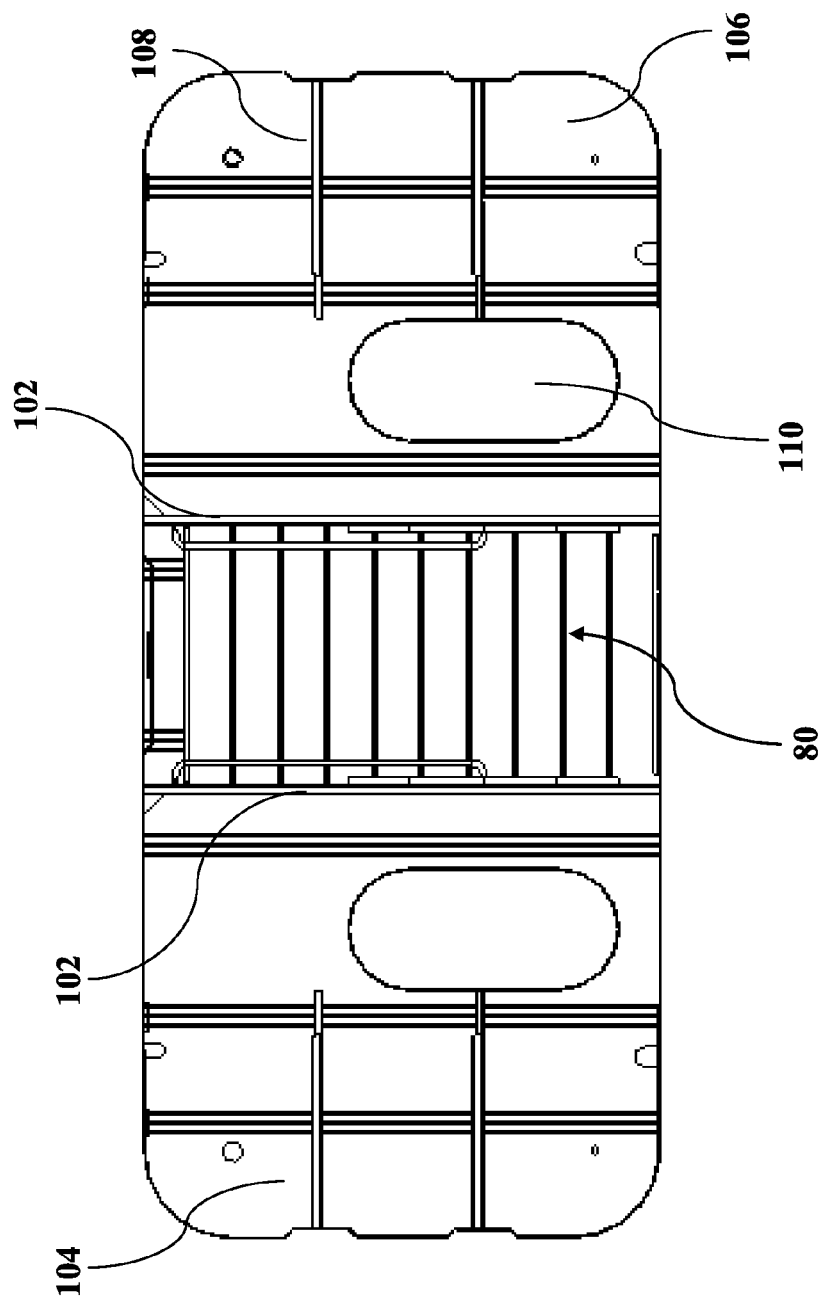
FIG. 7 depicts a rear cut-away view showing internal baffle system & stair access of the tank of FIG. 1.

The baffle system 100 design depicted in FIG. 4 provides structural support for the tank 12 while mitigating confined space restrictions by allowing personnel unrestricted access to the various compartments created by the baffle system 100. FIG. 7 depicts how the baffle system 100 and baffle openings 110 are arranged and sized in such a manner as to provide a direct line of sight with unimpeded travel corridors for personnel movement within the tank 12. The horizontal baffles 108 are shaped to provide unrestricted access through the baffle openings 110 and unimpeded travel corridors through the compartments formed by the baffle system 100 as depicted in FIG. 8. The horizontal baffles 108 are depicted in FIG. 8 with a curved interior edge, but they could also be straight or other shapes. The doorless baffle system 100 may also be inherently safer as there are no doors or coverings to accidentally close or jam and thereby entrap personnel.

Confined space constraints are further mitigated by the size of the baffle access openings 110. The baffle openings 110 are sized so that a person of average stature may freely pass through the opening without excessive climbing, crawling, scrambling, twisting, or bending. The baffle system 100 arrangement also reduces the "maze" effect associated with some other baffle configurations. To mitigate confined space restrictions, there must also be an unrestricted means to enter and exit the tank 12.

The present tank achieves this by providing access through the fill port 70 to stairs 80 that descend from the top 50 of the tank 12 to the floor 60 of the tank 12. However, according to another embodiment, an access port or door is located in a bulkhead of the tank, in which case a stairway may not be needed. Alternatively, rather than a permanent stairway, a removable stairway may be used.

Figure 9:
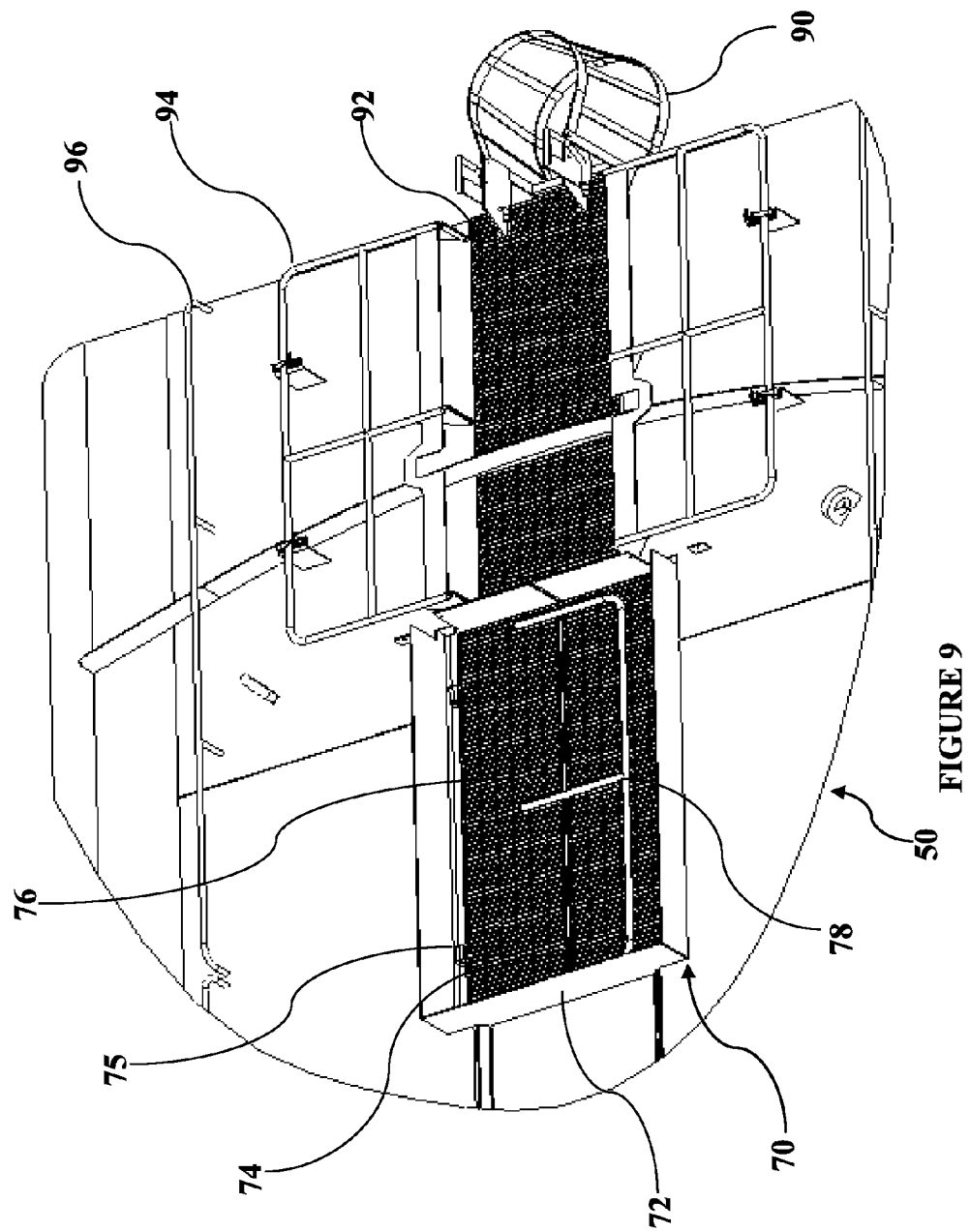
FIG. 9 depicts a partial isometric view showing closed fill port stair access & lowered guardrails of the tank of FIG. 1.
Figure 10:
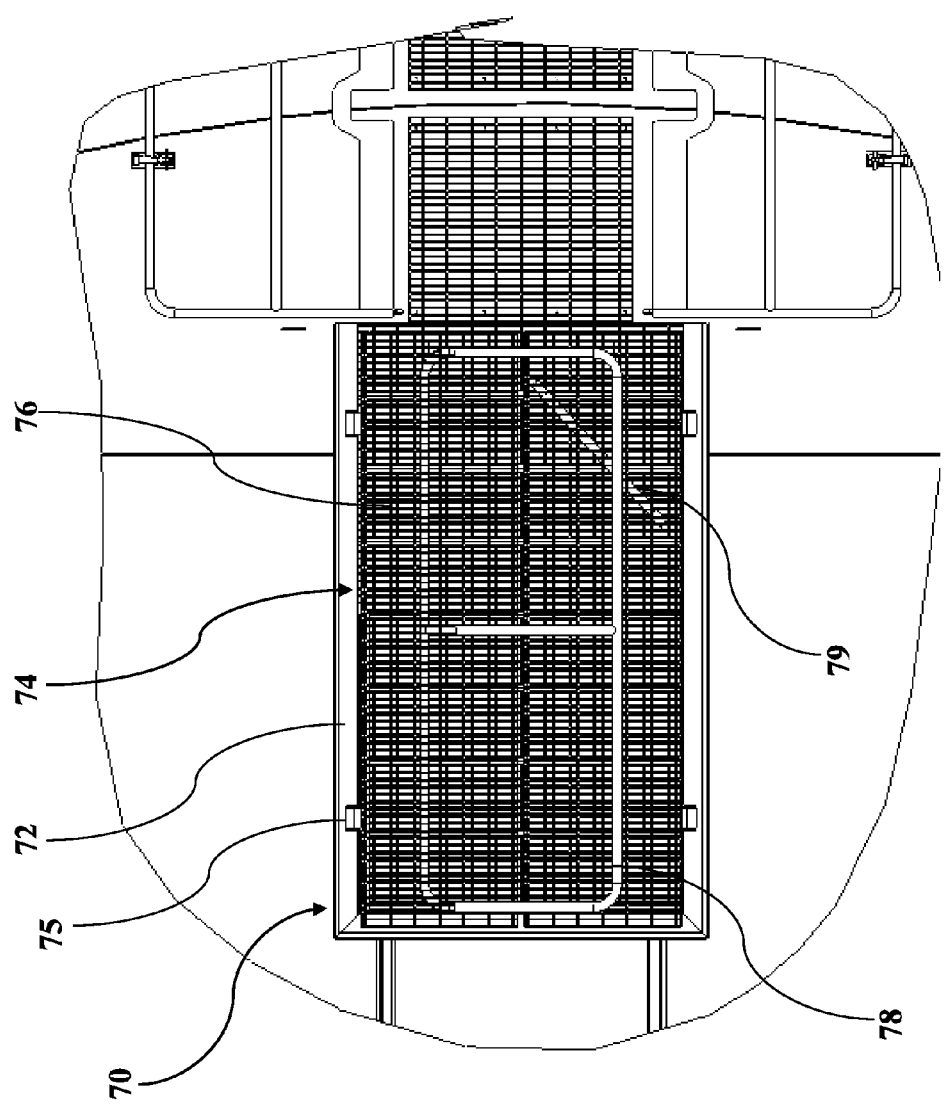
FIG. 10 depicts a partial top plan view showing closed fill port stair access & lowered guardrails of the tank of FIG. 1.
Figure 11:
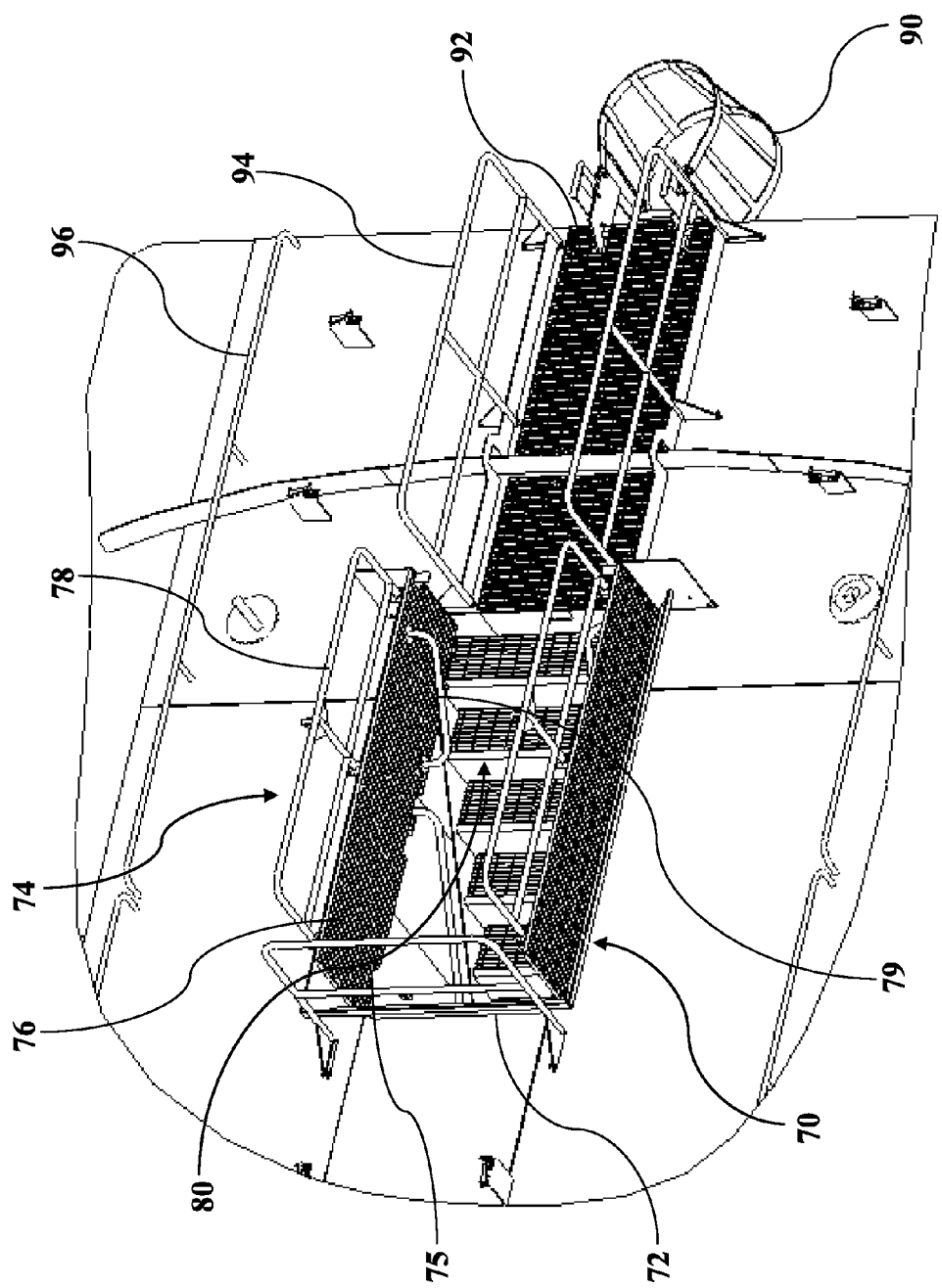
FIG. 11 depicts a partial isometric view showing open fill port stair access & raised guardrails of the tank of FIG. 1.

As depicted in FIGS. 9 through 11, the fill port 70 is comprised of a plurality of plates 72 and two hinged access covers 74. The fill port 70 performs multiple functions on the tank 12 such as fluid containment, splash back reduction, debris filtration, and fall protection. The fill port 70 also provides access to the stairs 80 that descend into the tank 12.

The fill port 70 plates 72 frame the fill opening and extend above the top 50 of the tank 12 to contain the fluid and minimize splash back during the filling process. The hinged access cover 74 is comprised of a plurality of hinges 75, an open grating 76, an integrated safety guardrail 78, and an integrated handrail 79. During tank 12 filling and operation, the hinged access covers 74 and the safety guardrails 94 are in the closed or folded down position as shown in FIG. 9. The open grating 76 prevents trash from entering the tank 12 during the filling process and also acts as a safety barrier to prevent personnel from falling into the fill opening while accessing the top 50 of the tank 12.

The open grating may be constructed from many different materials with an open profile such as, but not limited to, steel bar grating or expanded metal. When the access covers 74 are closed, the integrated safety guardrails 78 and the integrated handrails 79 nest together to prevent interference as shown in FIG. 10. When inspection, maintenance, or cleaning of the tank 12 interior is required, the access covers 74 and the safety guardrail 94 may be opened or folded up, providing access to the stairs 80 descending into the tank 12 as shown in FIG. 11. In the opened or up position, the integrated safety guardrails 78 provide a barrier to prevent personnel from falling into the fill opening. The integrated handrail 79 is a safety feature (and in some jurisdictions may be a required safety feature) to help prevent personnel from falling down the stairs 80 and to help guide personnel to the main stair handrails 89 inside the tank 12.

Figure 12:
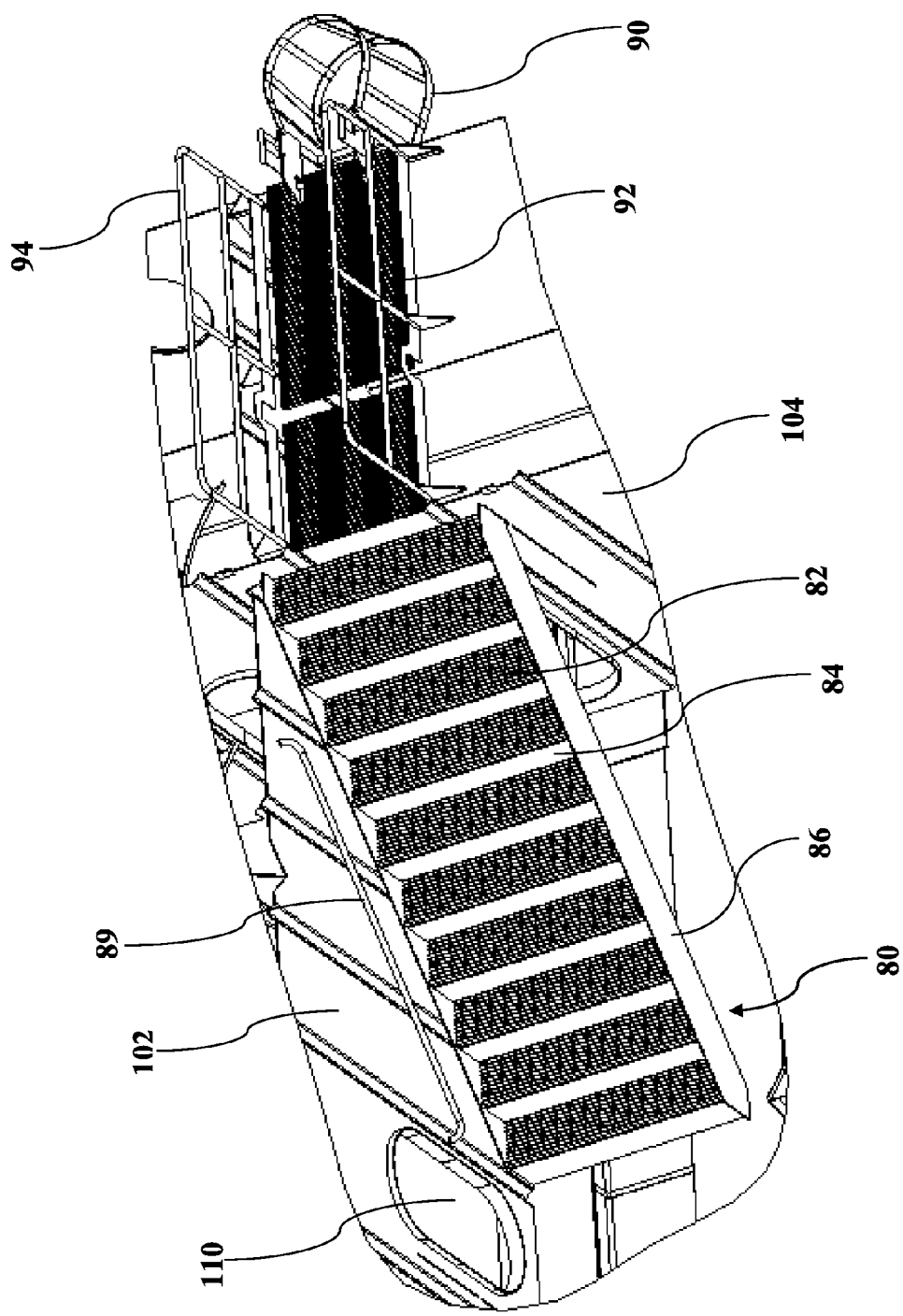
FIG. 12 depicts a partial isometric cut-away view showing stair access of the tank of FIG. 1.
Figure 13:
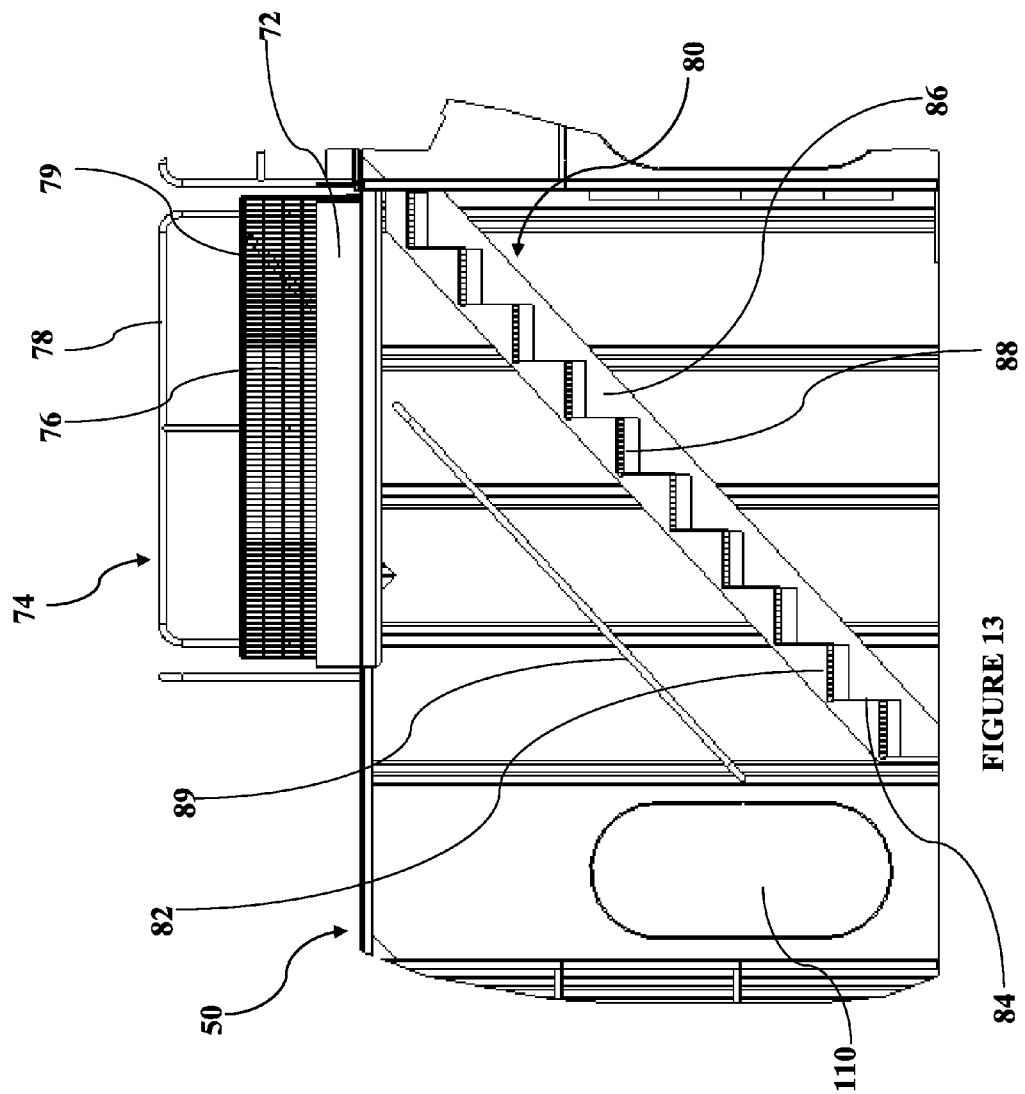
FIG. 13 depicts a partial side cut-away view showing fill port stair access and stairs inside tank of the tank of FIG. 1.

FIGS. 12 and 13 show the stairs 80 descending into the tank 12 interior. The stairs 80 are comprised of a plurality of treads 82, a plurality of risers 84, a plurality of stringers 86, a plurality of support angles 88, and a plurality of handrails 89. The treads 82 are of open grating construction to allow the fluid to pass through and promote filling of the tank. The stair risers 84 are solid and provide structural support for the stair treads 82 and the longitudinal baffles 102. The risers 84 also act as transverse baffles to further control fluid motion and surge during vehicle 10 acceleration and deceleration. In other embodiments, the treads 82 may be constructed from solid material and the risers 84 may also be constructed from material with an open profile. Although the embodiment depicted in FIG. 12 utilizes open treads 82 and solid risers 84, many combinations of open and solid material may be used in constructing the treads 82 and risers 84 of the stairs 80.

The stair 80 access through the tank fill port 70 into the tank 12 interior mitigates the confined space designation as the stairs 80 provide an unrestricted means for entry and exit into the tank 12. The stairs 80 may be of many different sizes and styles, but are typically comprised of a uniform rise and run combination that results in a stair angle to the horizontal between 30° and 50° per safety standards and regulations. Of course, other specific designs may be employed, the decision often being driven by local regulatory codes.

Figure 14:
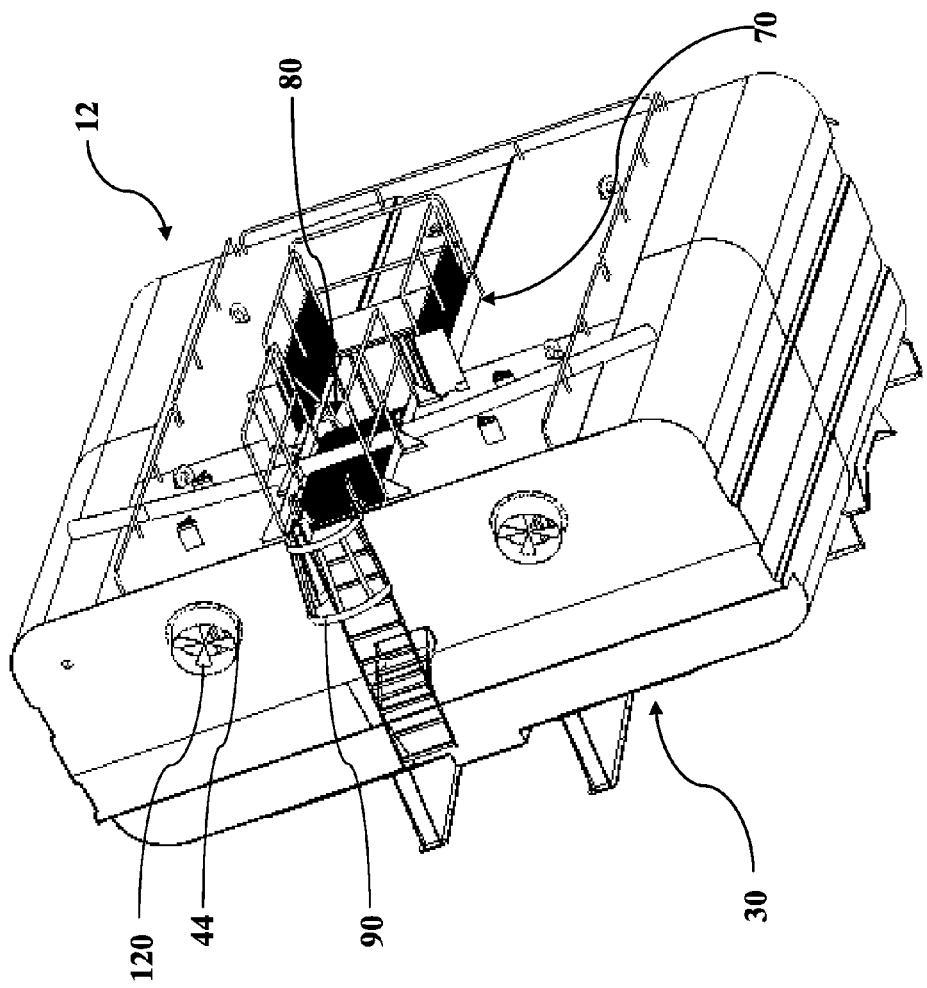
FIG. 14 depicts a front isometric view showing ventilation fans attached to ports on front bulkhead of the tank of FIG. 1.
Figure 15:
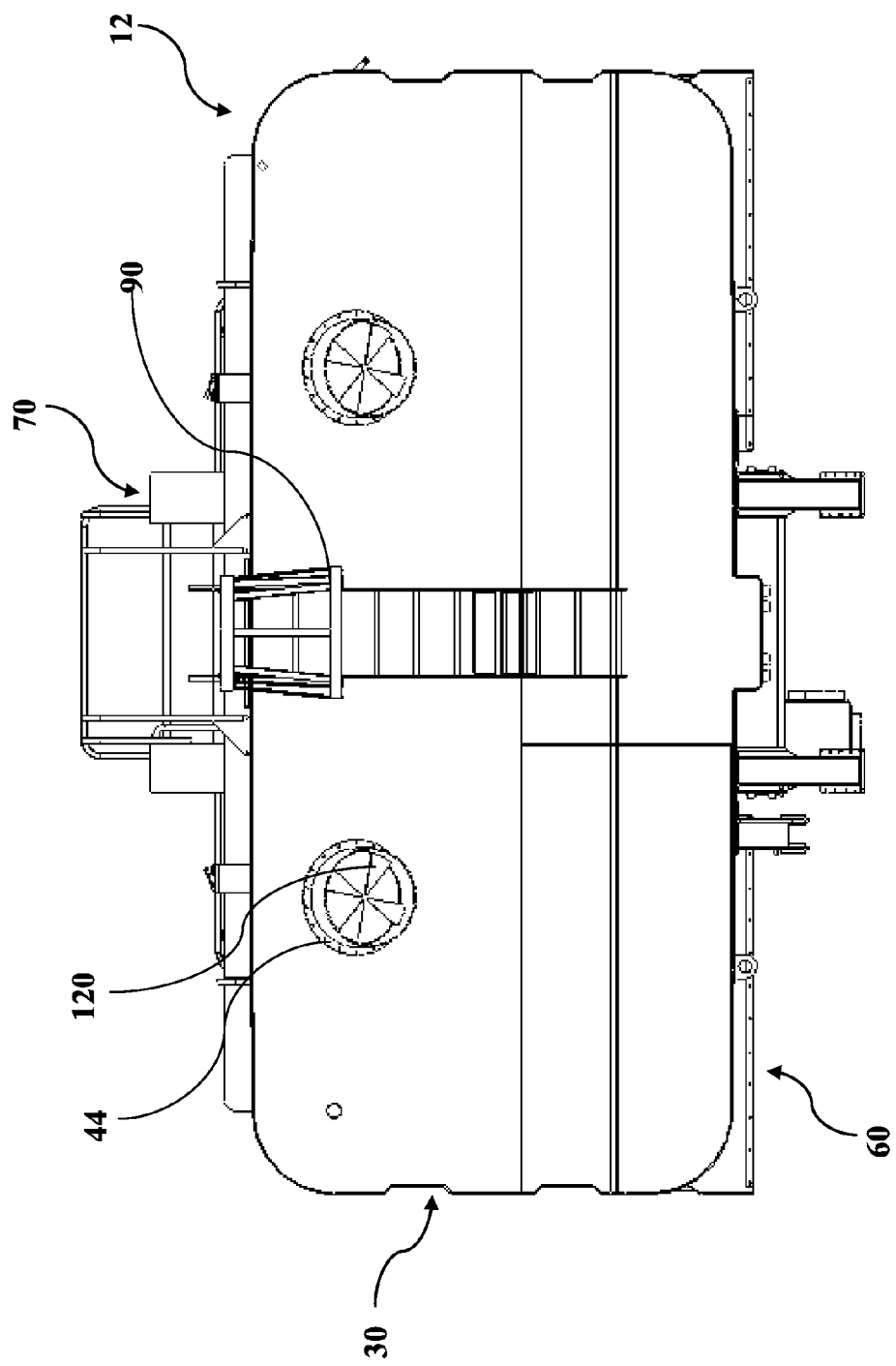
FIG. 15 depicts a front elevation view showing ventilation fans attached to ports on front bulkhead of the tank of FIG. 1.
Figure 16:
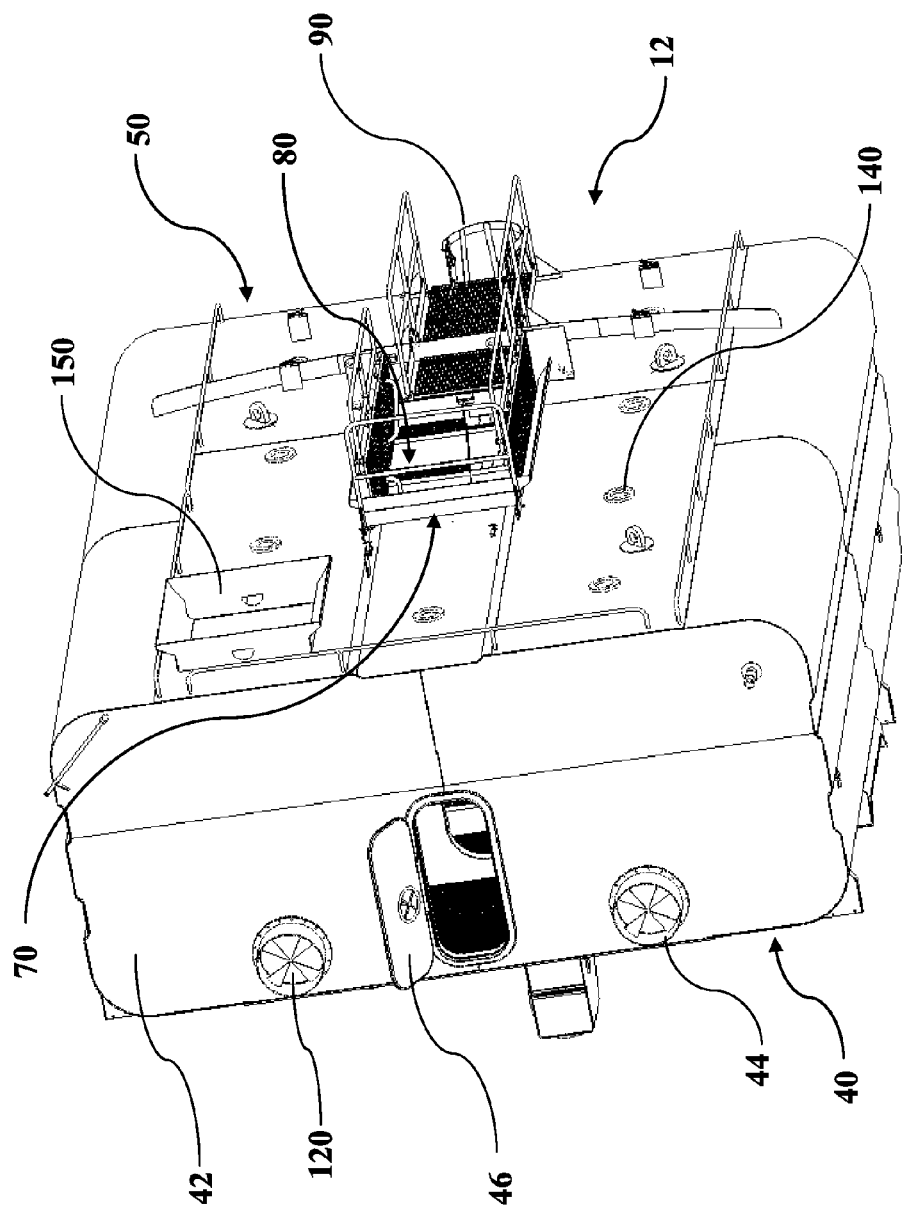
FIG. 16 depicts a rear isometric view showing ventilation fans attached to ports, an access door on the rear bulkhead of the tank, additional ventilation ports located in the top of the tank, and a second fill port.

FIGS. 14, 15, and 16 depict a ventilation system comprised of fans 120 attached directly to the ventilation ports 44 in the front bulkhead 30 and rear bulkhead 40 respectively. During manufacturing and maintenance of the tank 12, the fans 120 may be used to circulate fresh air through the tank 12 to keep air quality within acceptable regulation requirements and to prevent other hazardous atmospheric conditions from occurring within the tank 12. FIG. 16 depicts additional ventilation ports 140 located in the top 50 of the tank 12 as may be required by some local regulatory codes. The ventilation ports 140 are located above each compartment created by the baffle system 100. FIG. 16 also depicts an additional access door 46 in the rear bulkhead 40.

The ventilation system utilizes the large fill port 70 opening required for the stair 80 access as an air exhaust or an air intake while moving fresh air through the tank 12. Depending on their direction of operation, the fans 120 will pull fresh air from outside the tank 12 in through the ventilation ports 44, circulate it through the tank 12, and exhaust it out the large fill port 70 and, if present, the additional ventilation ports 140 in the top of the tank 12. In the opposite direction of operation, the fans 120 will pull fresh air in through the large fill port 70 and, if present, the additional ventilation ports 140 in the top of the tank 12, circulate it through the tank 12, and exhaust it through the opposing ventilation ports 44 in the front bulkhead 30 and rear bulkhead 40 respectively. It will be appreciated that many combinations and arrangements of fans 120 and intake or exhaust through the ventilation ports 44 may be employed. Additional access doors 46 may be incorporated in the front bulkhead 30 or the rear bulkhead 40 for use when the ventilation ports 44 have fans 120 attached to them. Of course, other door and port configurations may also be employed.

FIG. 16 also depicts an additional fill port 150 that may be located in various positions in the top 50 of the tank 12. The additional fill port 150 is independent of the stair 80 access fill port 70 and provides an alternate location for filling the tank 12. The inclusion of the additional fill port 150 is typically at the specific request of a customer.

Figure 17:
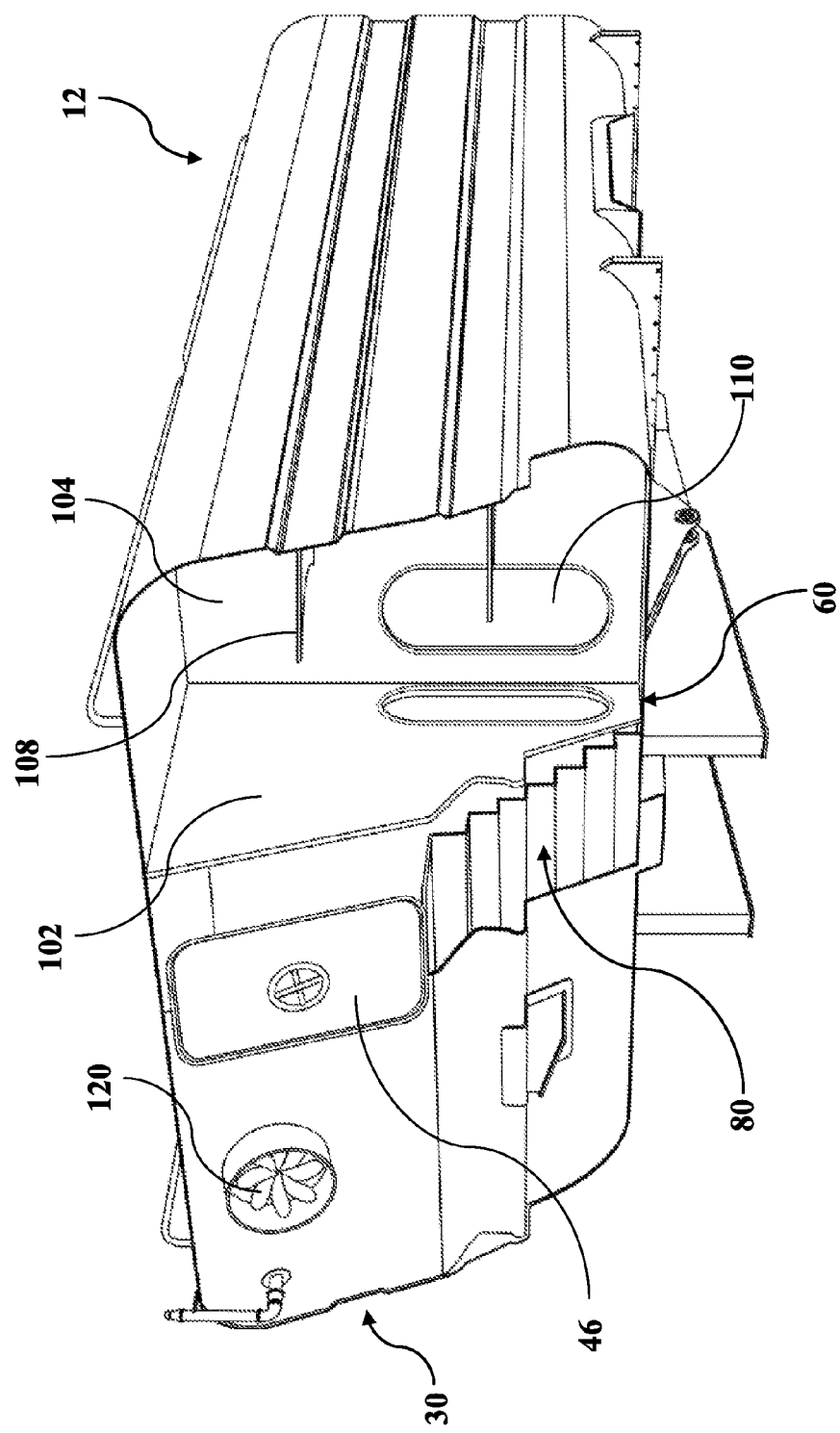
FIG. 17 depicts a front isometric cut-away view showing an embodiment with an access door in the front bulkhead with stairs leading from the door to the bottom of the tank.

FIG. 17 depicts another embodiment in which the tank 12 has a stairway 80 affixed to the front bulkhead 30 of the tank 12. An access door 46 located in the front bulkhead 30 of the tank 12 allows access to the top of a stairway 80 that descends to the floor 60 of the tank 12 and thus the interior of the tank 12. It will be appreciated that the stairway 80 may be affixed to the rear bulkhead 40 of the tank 12 with the access door 46 located in the rear bulkhead 40. The stairway 80 may be affixed to, formed into, or removable from the bulkhead in which the access door 46 is located.

Figure 18:
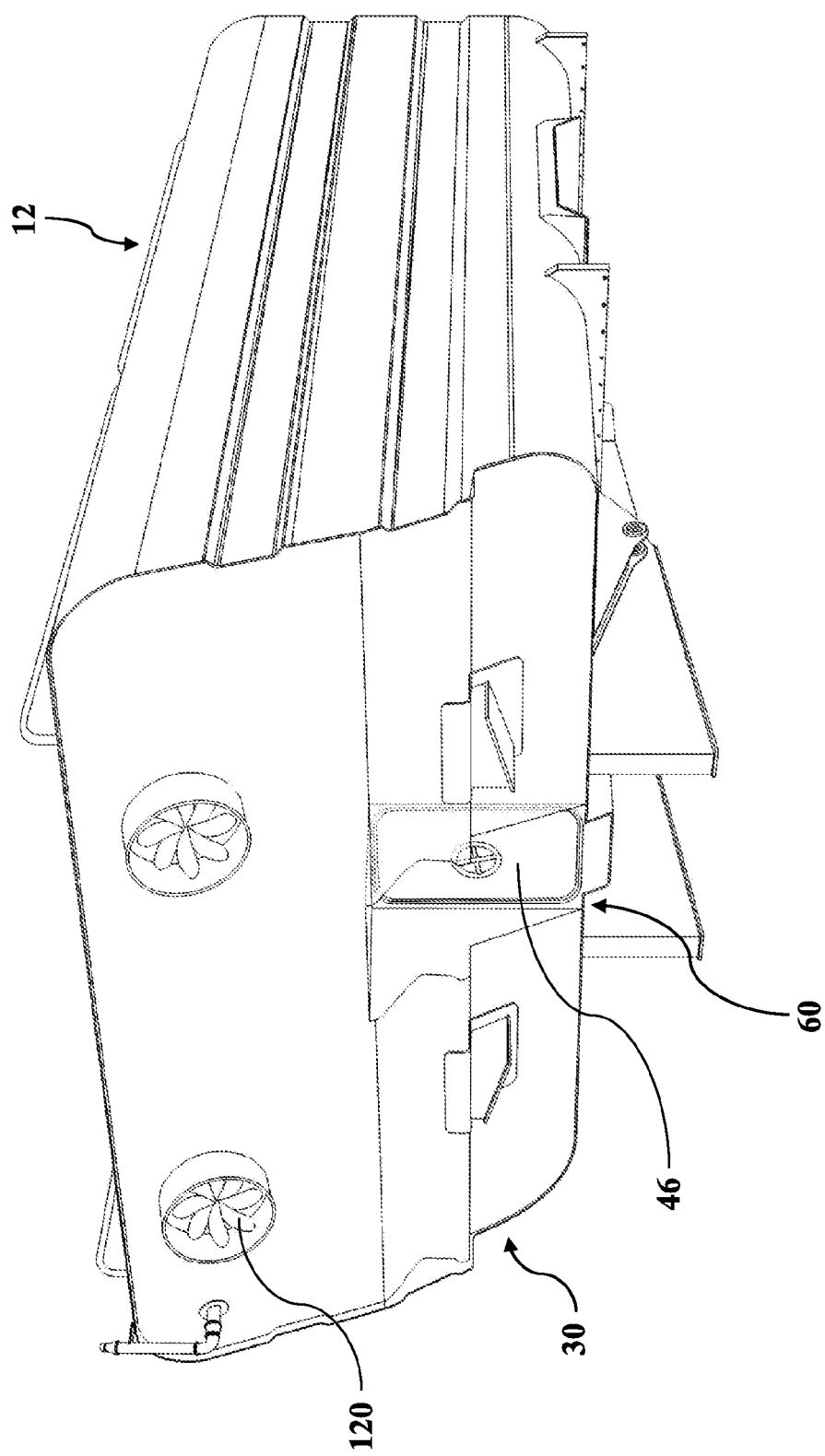
FIG. 18 depicts a front isometric view showing an embodiment with an access door in the front bulkhead at about the level of the floor.

FIG. 18 depicts another embodiment where an access door 46 is located in the front bulkhead 30 of the tank 12. A second access door 46 may be placed in the rear bulkhead 40, as depicted in FIG. 16. The access doors 46 may be located at about the level of the floor 60, thereby largely, if not entirely, eliminating the need for a stairway 80.

Figure 19:
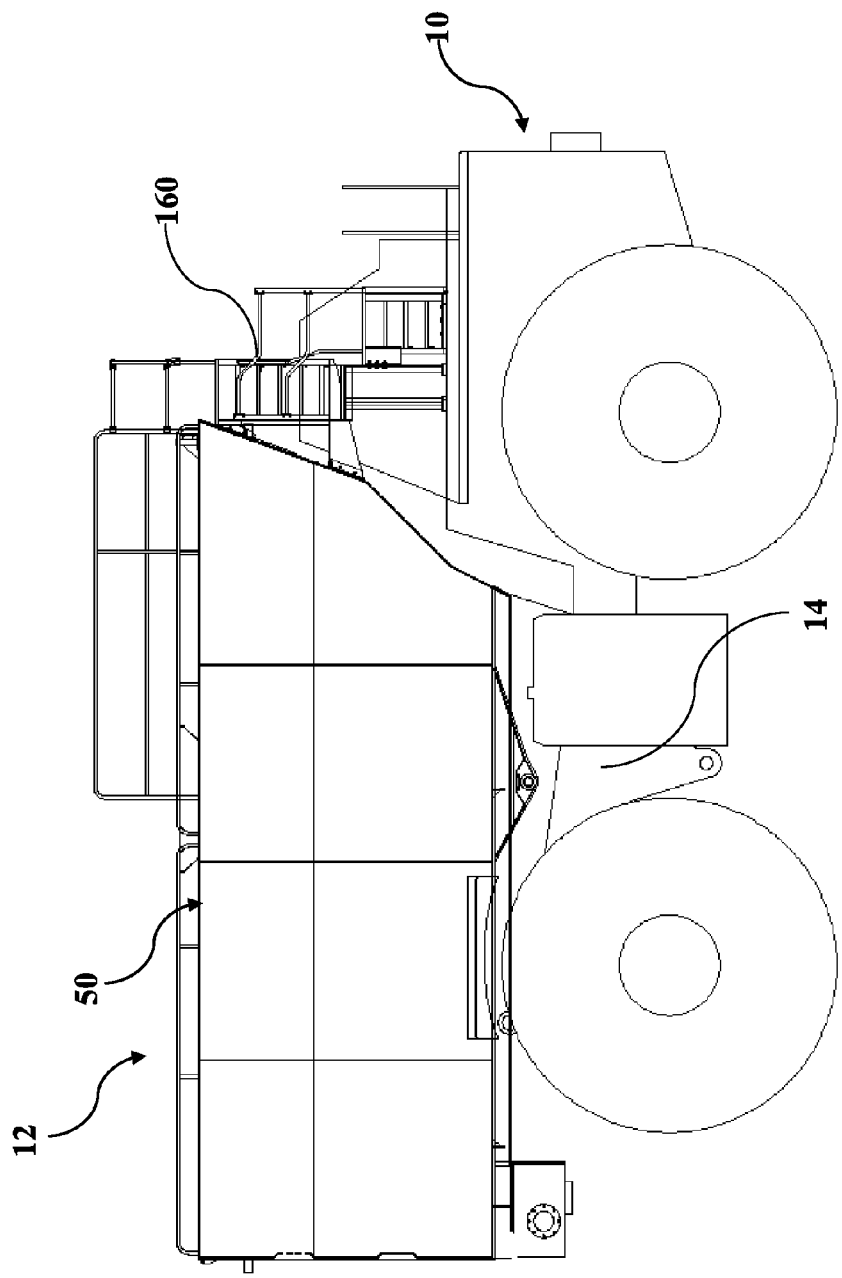
FIG. 19 depicts a side view showing an embodiment with an external stairway leading from the chassis to the top of the tank.

FIG. 19 depicts another embodiment of the tank 12 in which an external stairway 140 provides access from the vehicle 10 deck to the top 50 of the tank 12. In some instances, the external stairway 160 may be preferred over the external ladder 90 to access the top 50 of the tank 12.

Computational fluid dynamic ("CFD") simulations have greatly increased the understanding of the fluid motion and surging that occurs inside the tank 12 when excitations or forcing functions simulating the operational dynamics of the vehicle 10 are applied (that is, when the fluid dynamics of the vehicle in operation are simulated). CFD simulations show that by strategically locating the baffles, the baffle system 100 reduces transverse fluid surge up the sides of the tank 12 during cornering and normal operation and reduces longitudinal fluid surge during vehicle 10 acceleration or deceleration. CFD results also indicate that the fluid level greatly influences the magnitude of the forces that the fluid motion imparts on the tank 12 and the baffle system 100 during operation. Fluid levels less than full produce greater forces as there is more space for the fluid to surge.

Based on these findings, the horizontal baffles 108 are located at different elevations from the floor 60 to further suppress fluid surges at various fluid levels. The baffle system 100 reduces fluid surge without the need for doors or coverings on the baffle openings. Material requirements, weight, cost, maintenance, and safety issues are reduced by eliminating the doors and coverings on the baffle openings typically found in prior designs. The control of fluid motion with the baffle system 100 provides a more stable operating tank 12, increasing vehicle safety by reducing the chance of the vehicle 10 over turning.

Figure 21:
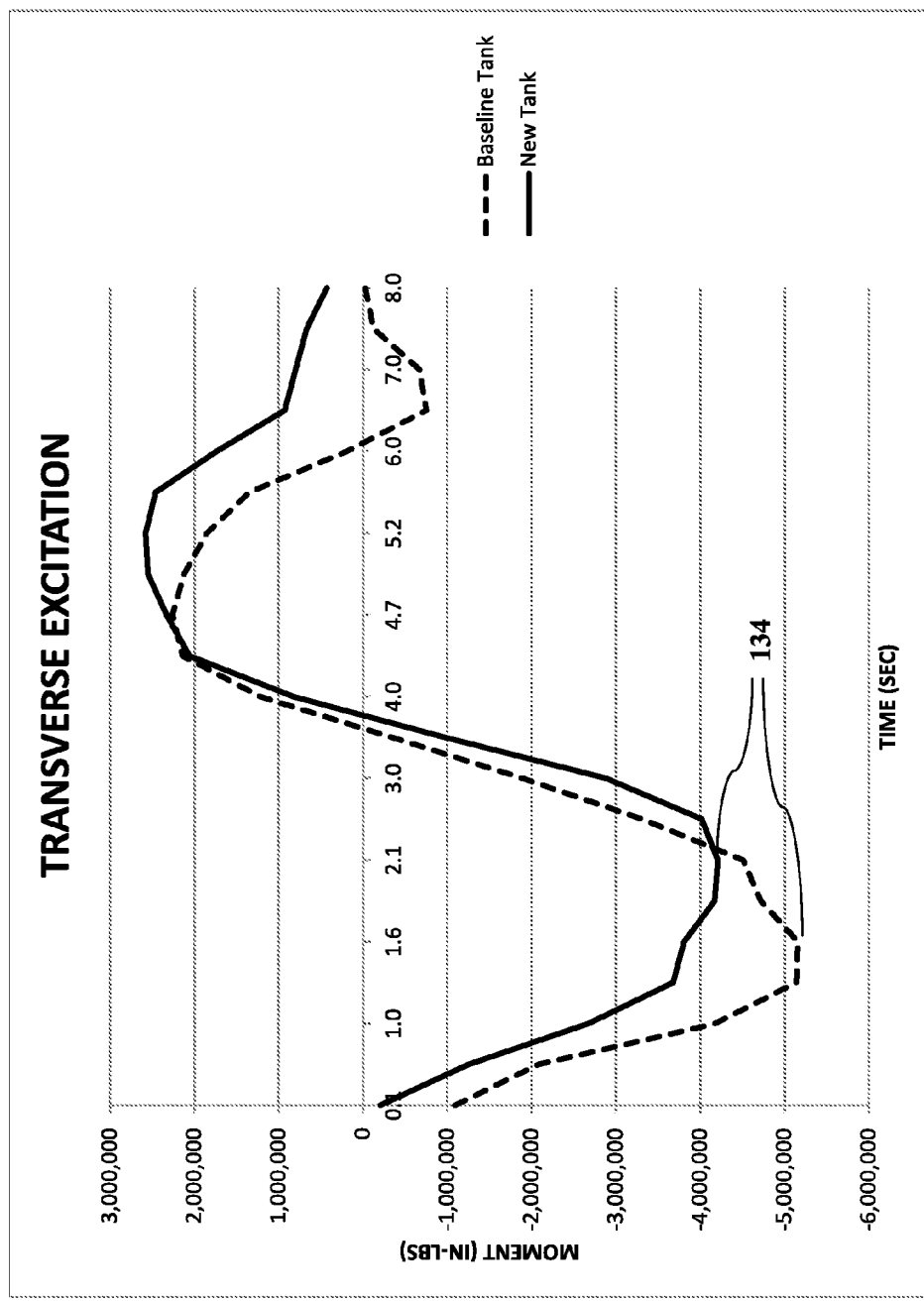
FIG. 21 depicts a graph of the data from FIG. 20.
Figure 22:
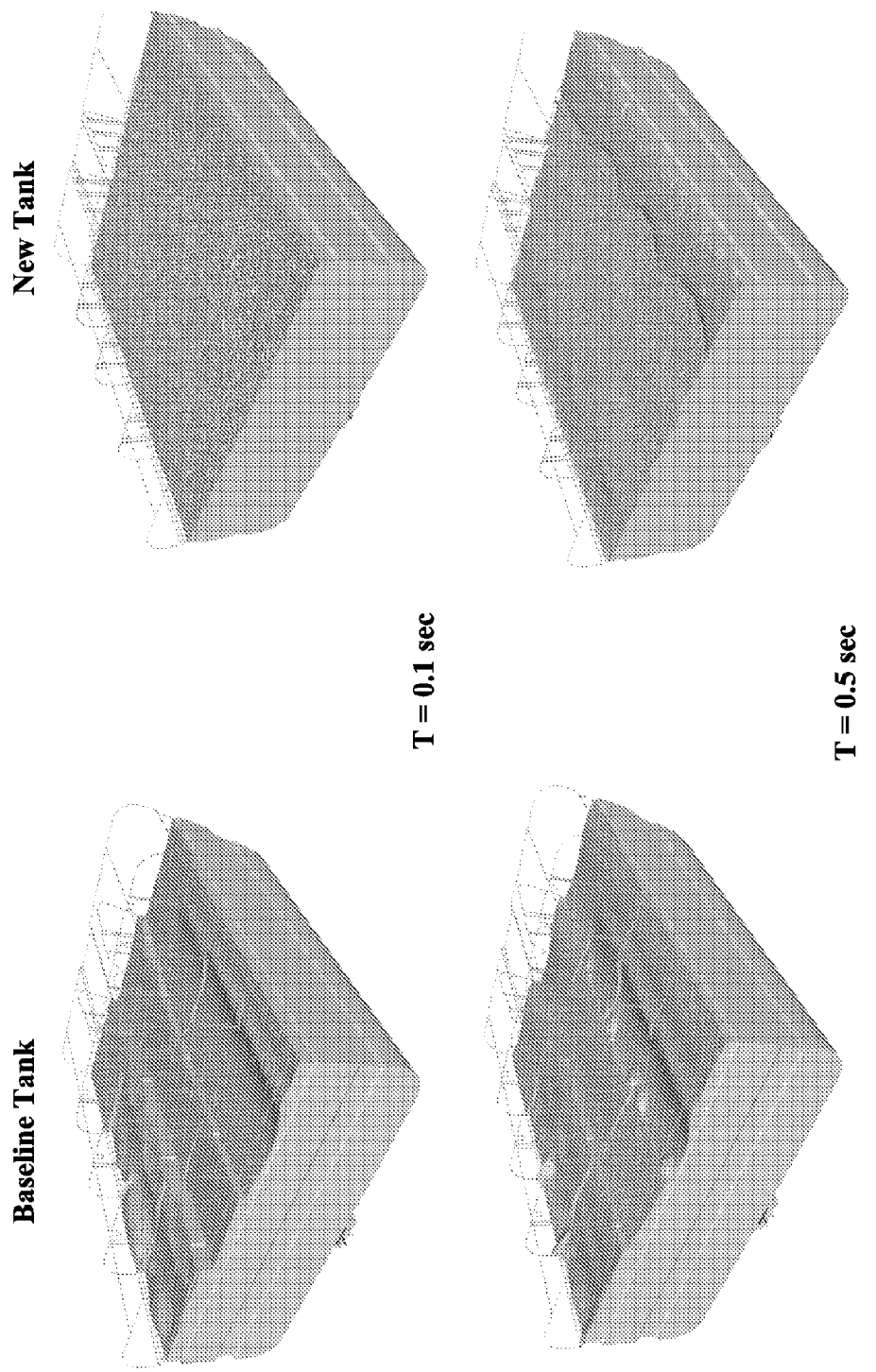
FIG. 22 depicts a picture comparing the respective transverse CFD simulations at time steps of 0.1 second and 0.5 seconds.
Figure 23:
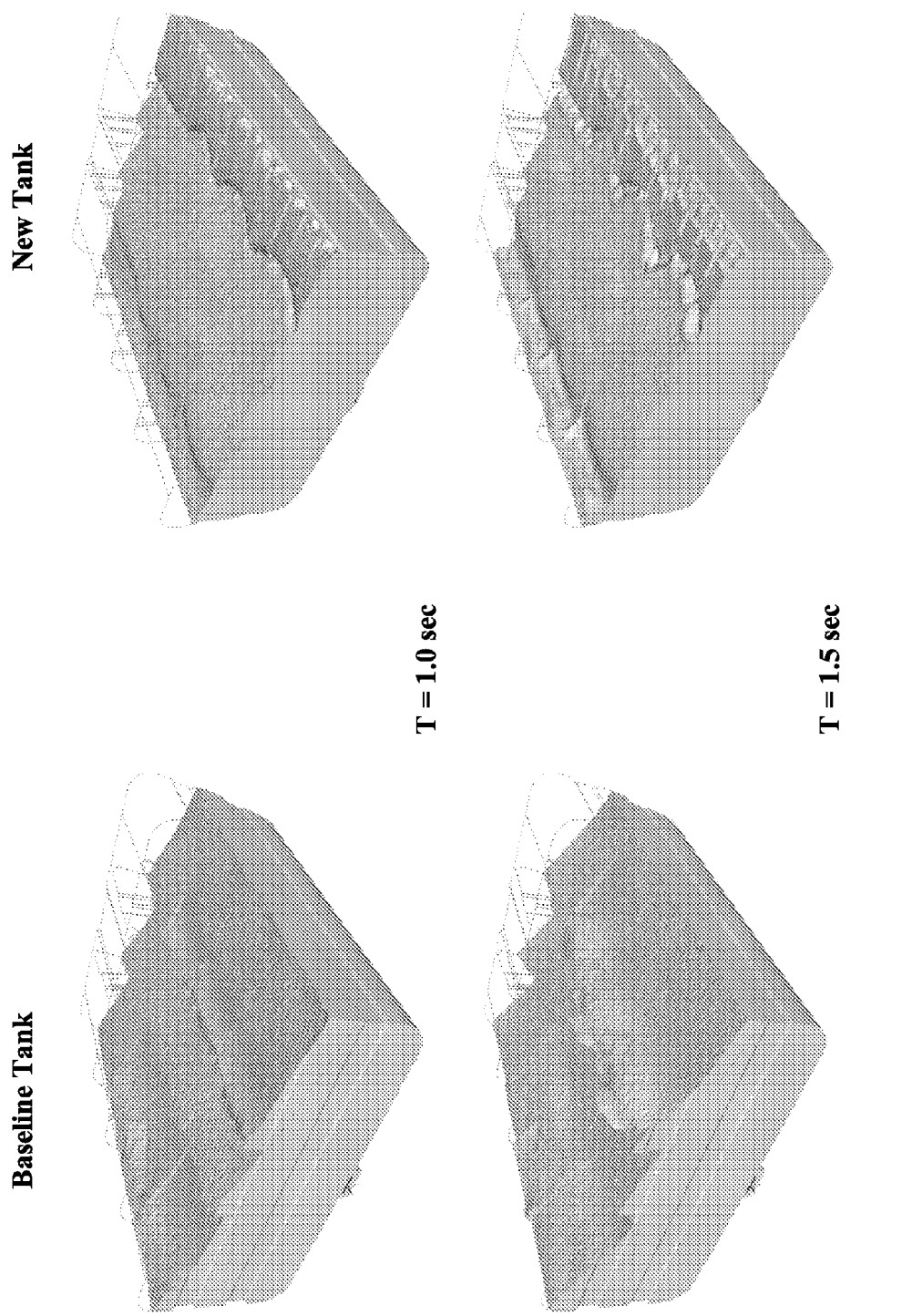
FIG. 23 depicts a picture comparing the respective transverse CFD simulations at time steps of 1.0 second and 1.5 seconds.
Figure 24:
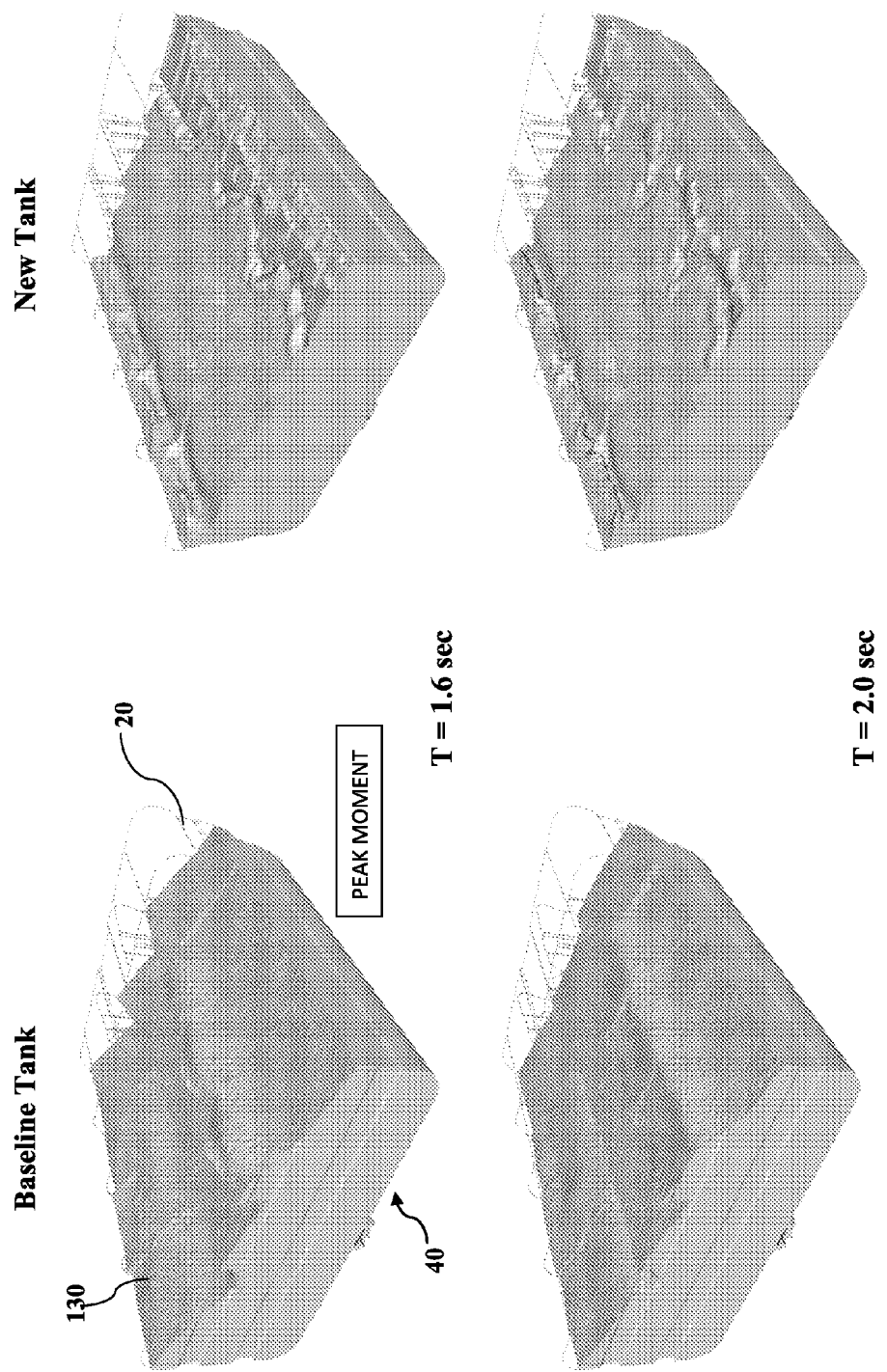
FIG. 24 depicts a picture comparing the respective transverse CFD simulations at time steps of 1.6 seconds and 2.0 seconds.
Figure 25:
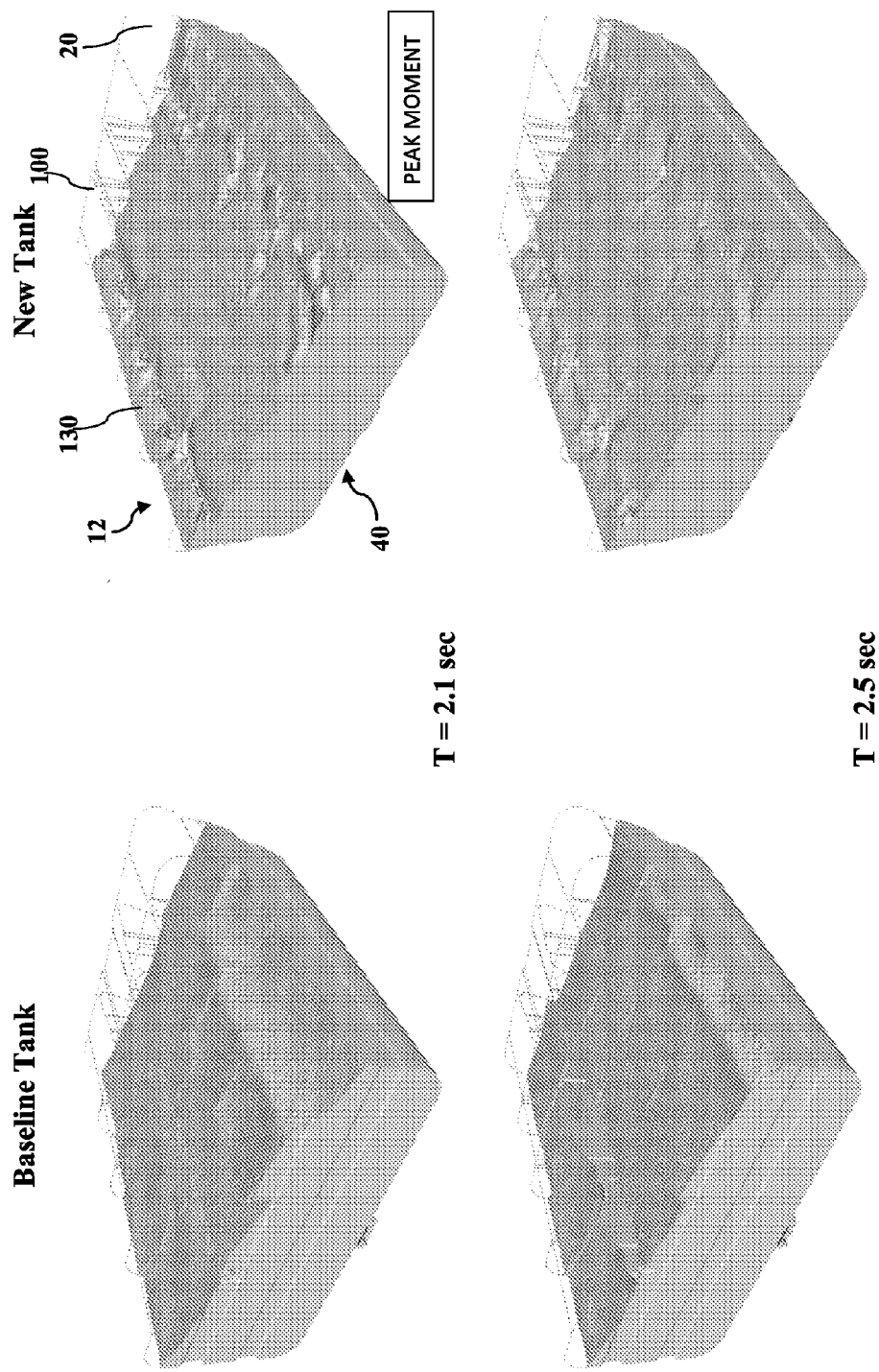
FIG. 25 depicts a picture comparing the respective transverse CFD simulations at time steps of 2.1 seconds and 2.5 seconds.
Figure 26:
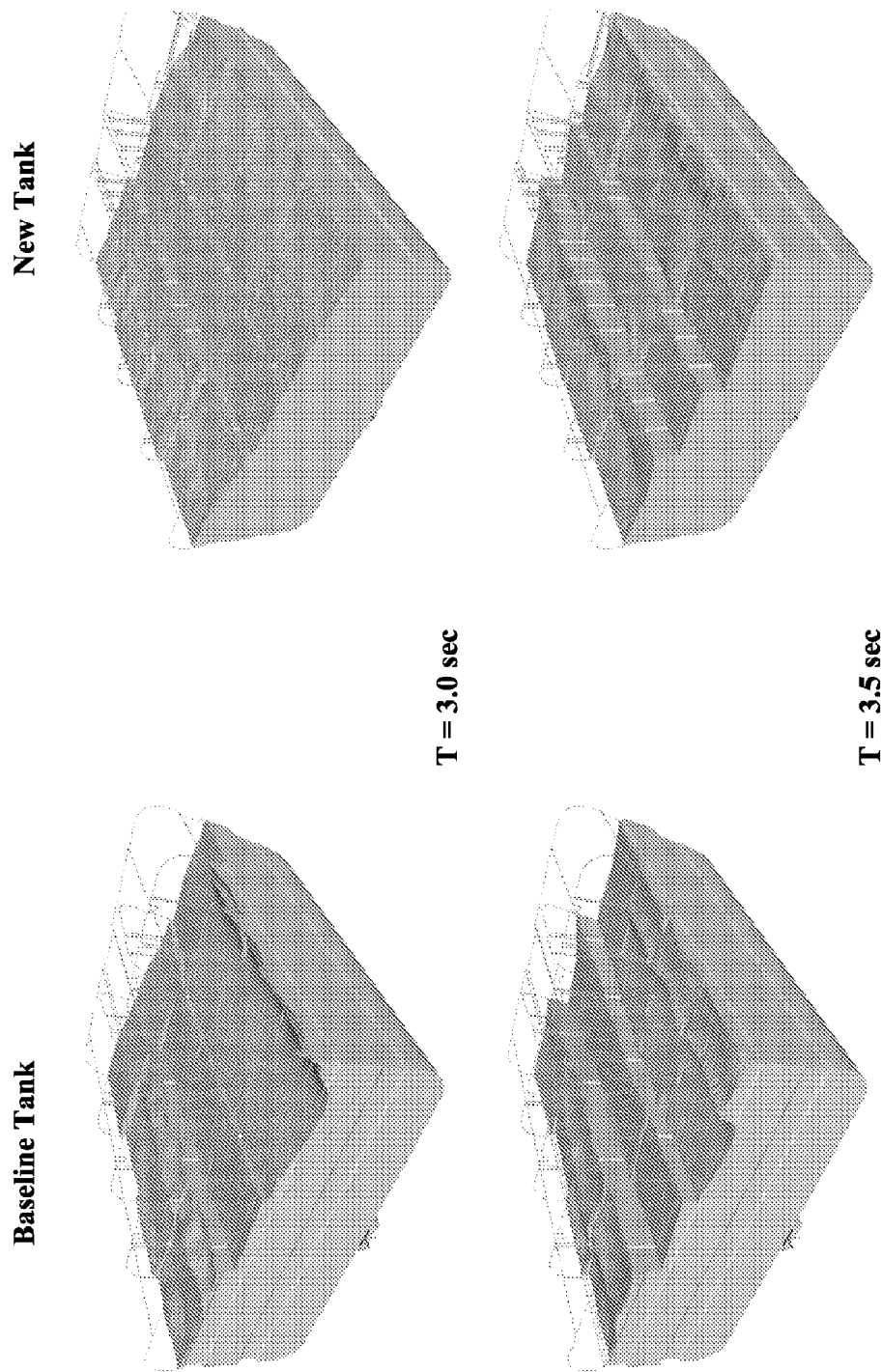
FIG. 26 depicts a picture comparing the respective transverse CFD simulations at time steps of 3.0 seconds and 3.5 seconds.
Figure 27:
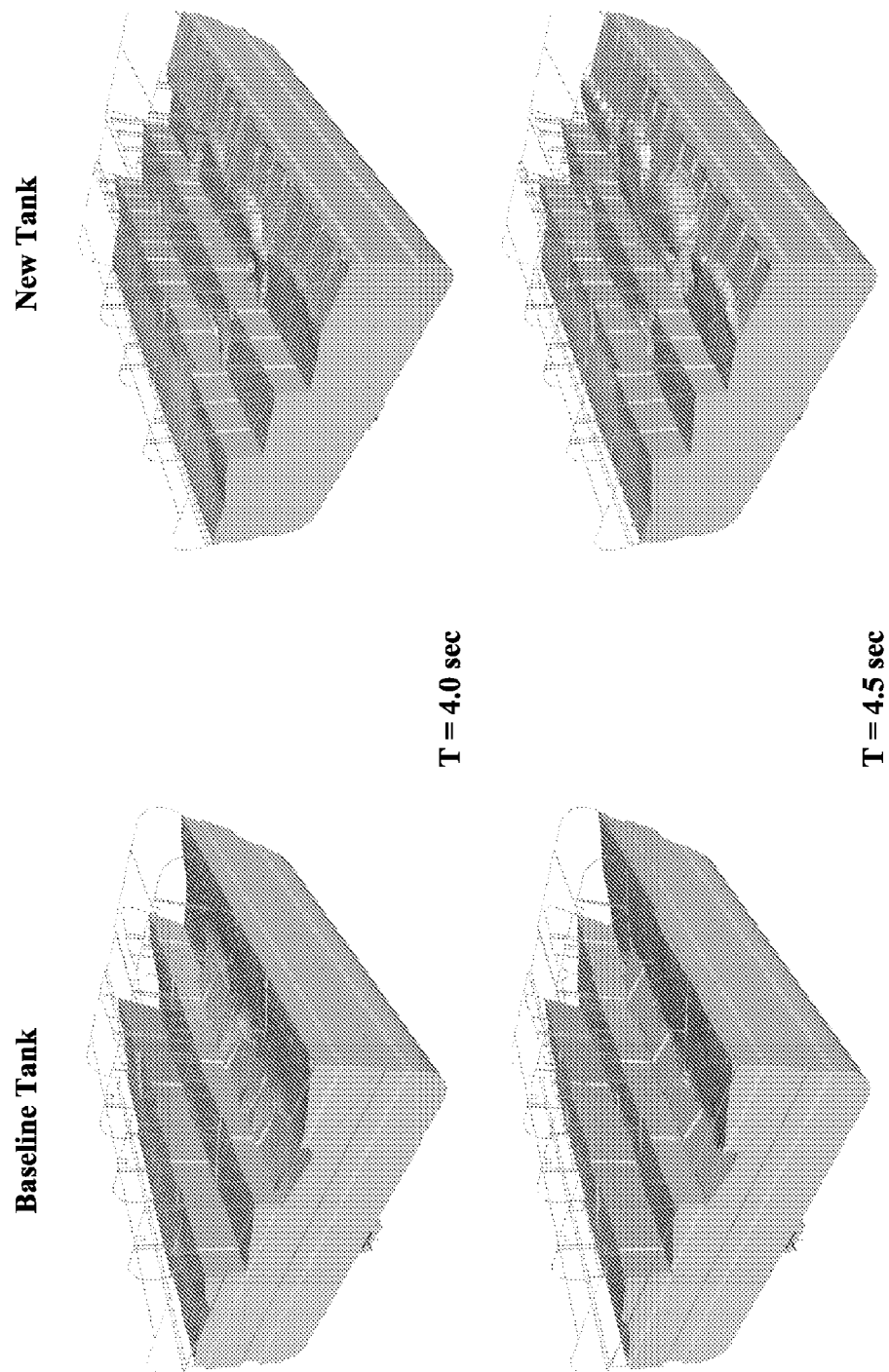
FIG. 27 depicts a picture comparing the respective transverse CFD simulations at time steps of 4.0 seconds and 4.5 seconds.

FIGS. 20 and 21 compare CFD simulation results of a baseline tank with the tank 12 of FIG. 1 when subjected to a transverse, or side to side, excitation simulating the vehicle 10 turning a corner or fluid motion during normal operation of the vehicle 10. FIGS. 22 through 30 are snapshots showing the fluid reactions at the various time steps of the simulation as the fluid surges from one side of the tank to the other. In addition to FIGS. 20 and 21, FIGS. 24 and 25 show that during the initial fluid surge 130, the baffle system 100 in the tank 12 more effectively controls fluid surge 130 up the side plates 20 of the tank 12, which results in a lower moment of force, or moment, being imparted on the vehicle 10.

Figure 28:
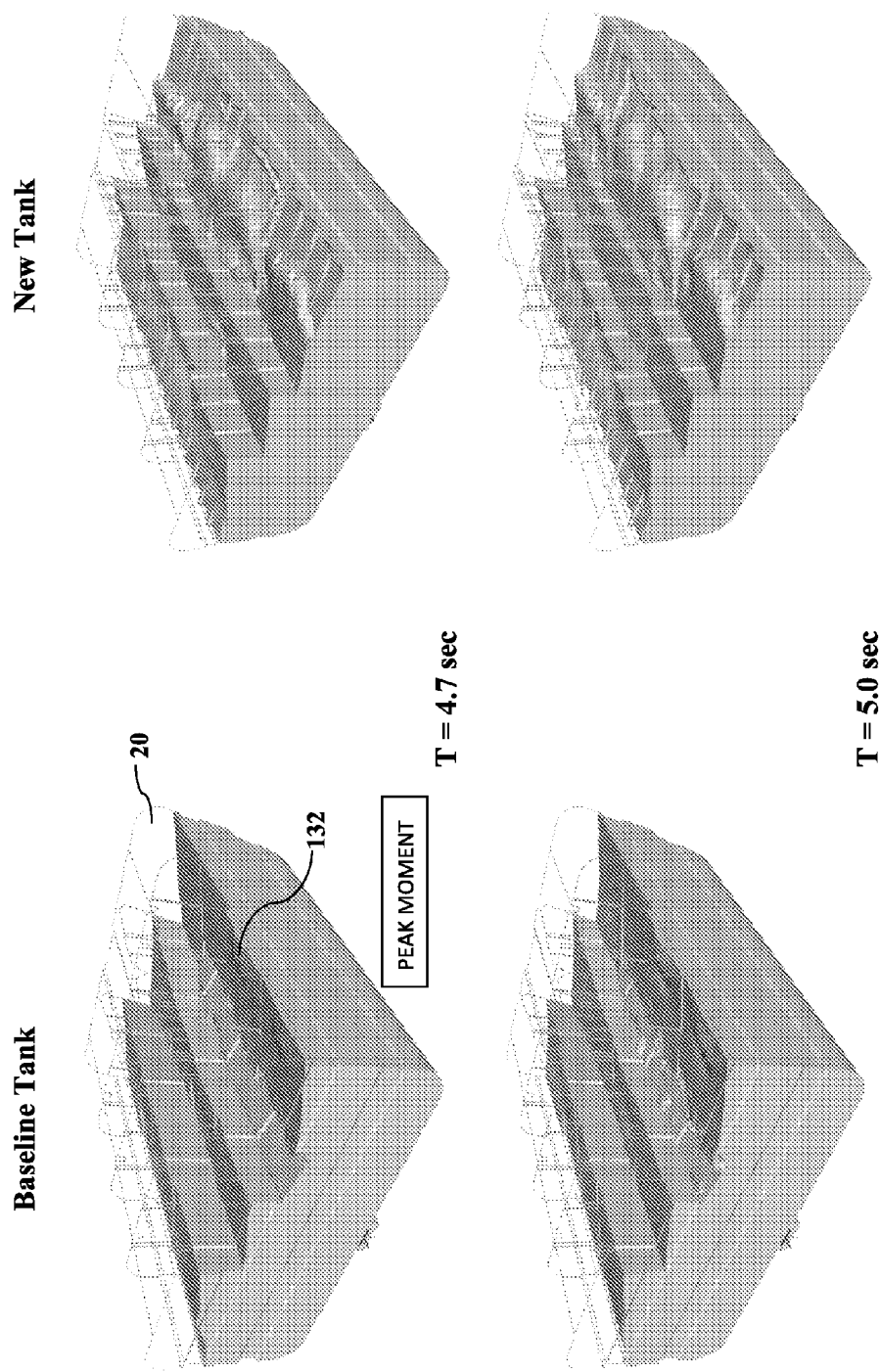
FIG. 28 depicts a picture comparing the respective transverse CFD simulations at time steps of 4.7 second and 5.0 seconds.
Figure 29:
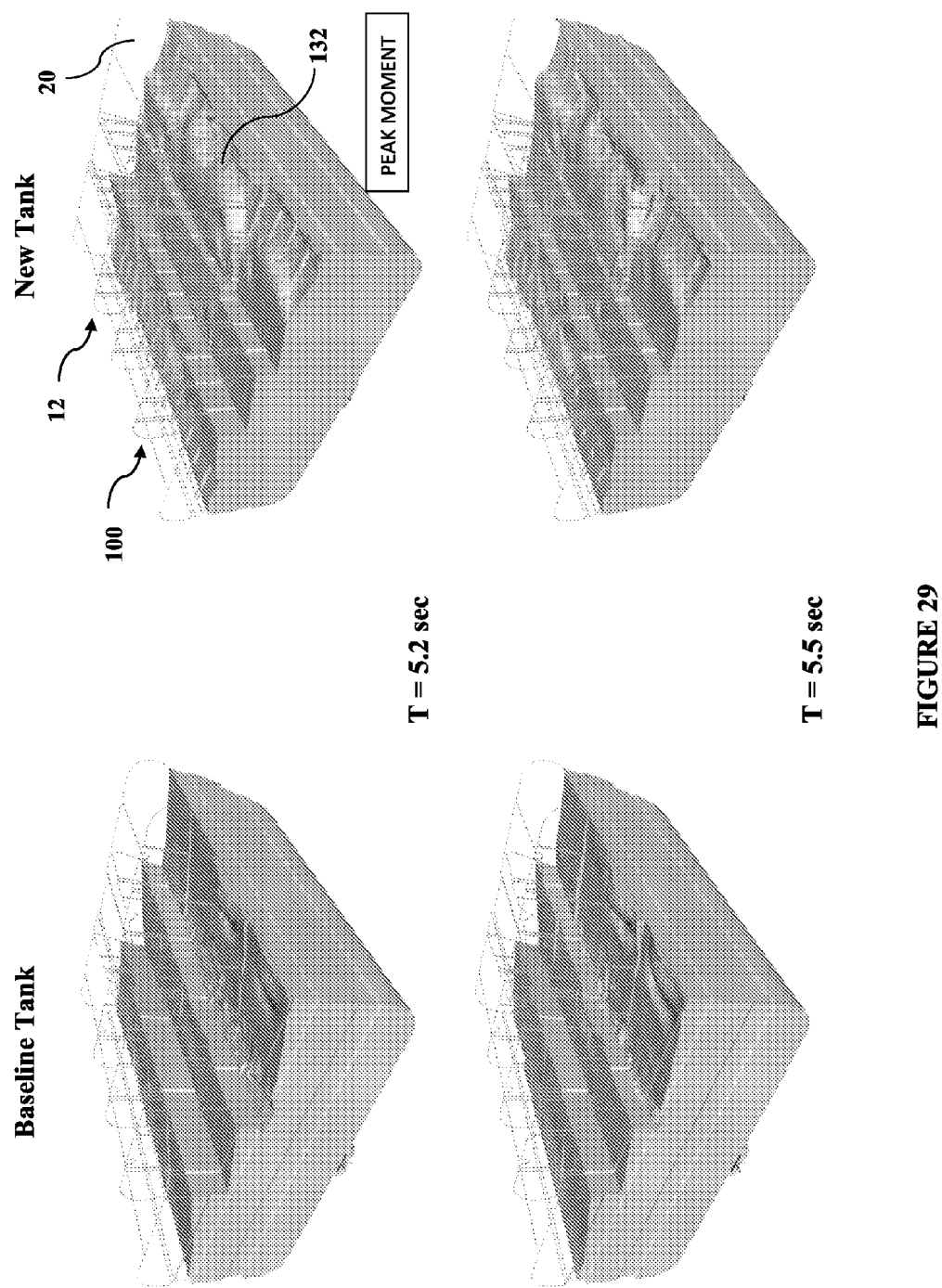
FIG. 29 depicts a picture comparing the respective transverse CFD simulations at time steps of 5.2 second and 5.5 seconds.
Figure 30:
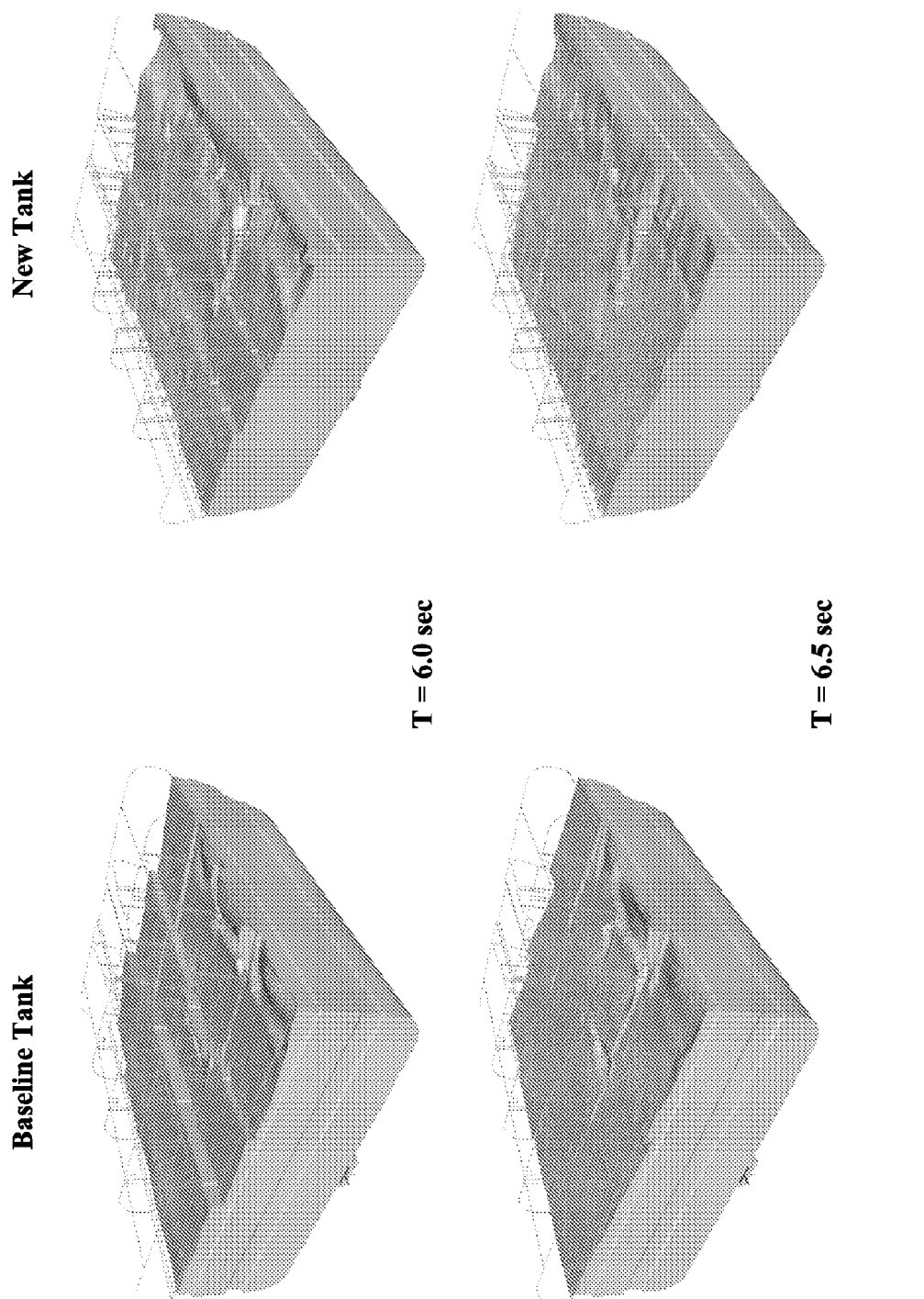
FIG. 30 depicts a picture comparing the respective transverse CFD simulations at time steps of 6.0 second and 6.5 seconds.

Because the moment is the tendency of a force to twist or rotate an object about an axis through a point, it is desirable to minimize these moments as much as possible to provide more stability in the tank 12 and vehicle 10. This reduces the chances that the vehicle 10 may over-turn due to the fluid motion within the tank 12. FIGS. 28 and 29 show the peak moments produced by the fluid motion as the fluid surges back to the opposite side 20 of the tank 12. Although the moment produced by the fluid surge 132 back to the opposite side of the tank 12 is slightly higher than the baseline tank, the difference in magnitude of the moments is much less than the difference in the magnitude of the moments during the initial surge direction. The magnitude of the moments produced as the fluid surges 132 back to the opposite side of the tank 12 are approximately 50% less than the magnitudes produced during the initial fluid surge 130.

Another advantage of the tank 12 is also apparent when comparing the data. FIG. 21 shows a phase shift 134 between when the peak moments occur in each respective tank. The peak moments in tank 12 of the present invention lag behind, or occur later, than the peak moments generated by the baseline tank. The lag in the peak moment in the tank 12 is advantageous as it allows the operator of the vehicle 10 additional time to react to the fluid surges further reducing the chances that the vehicle 10 will over-turn.

Figure 32:
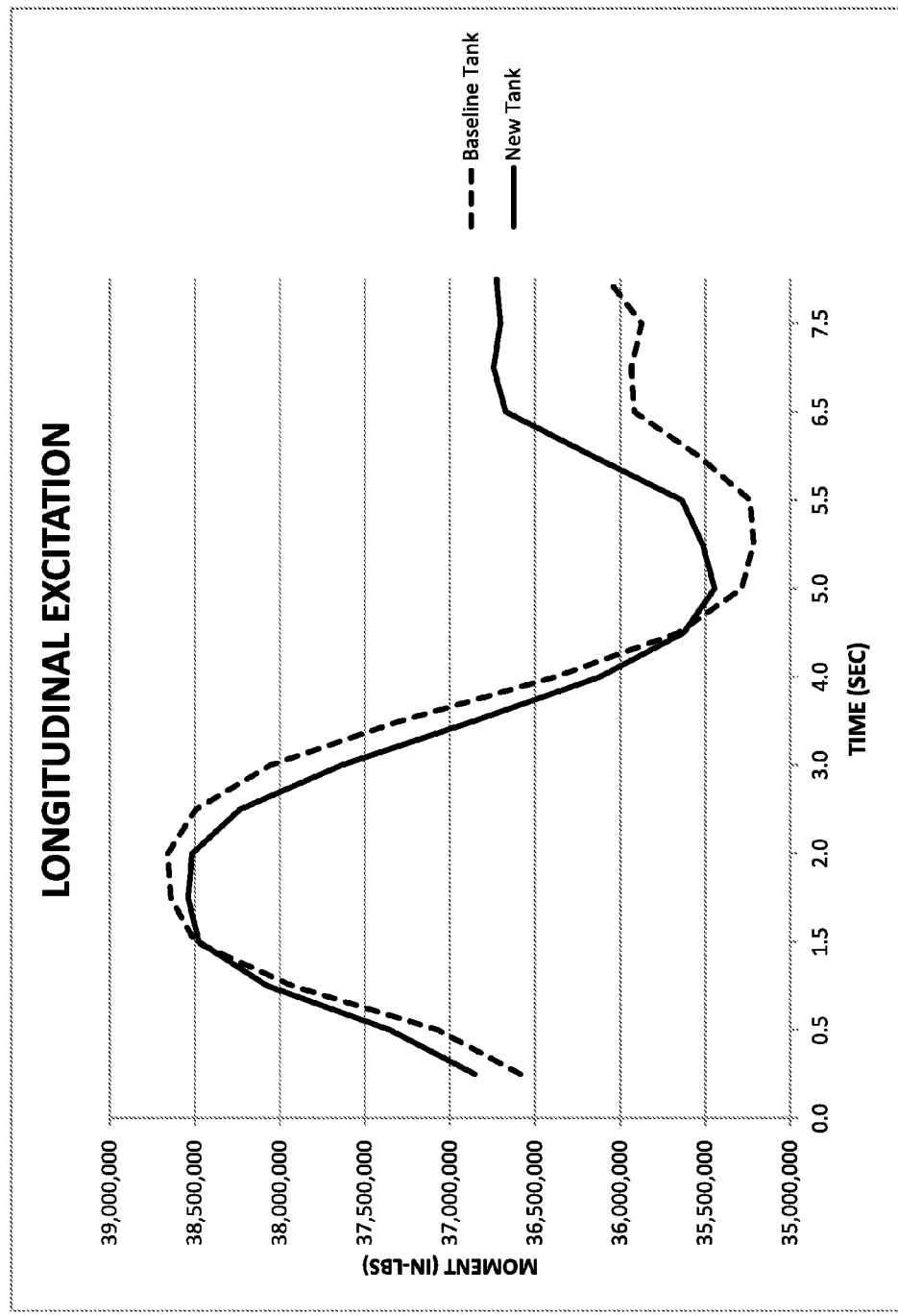
FIG. 32 depicts a graph of the data from FIG. 31.
Figure 33:
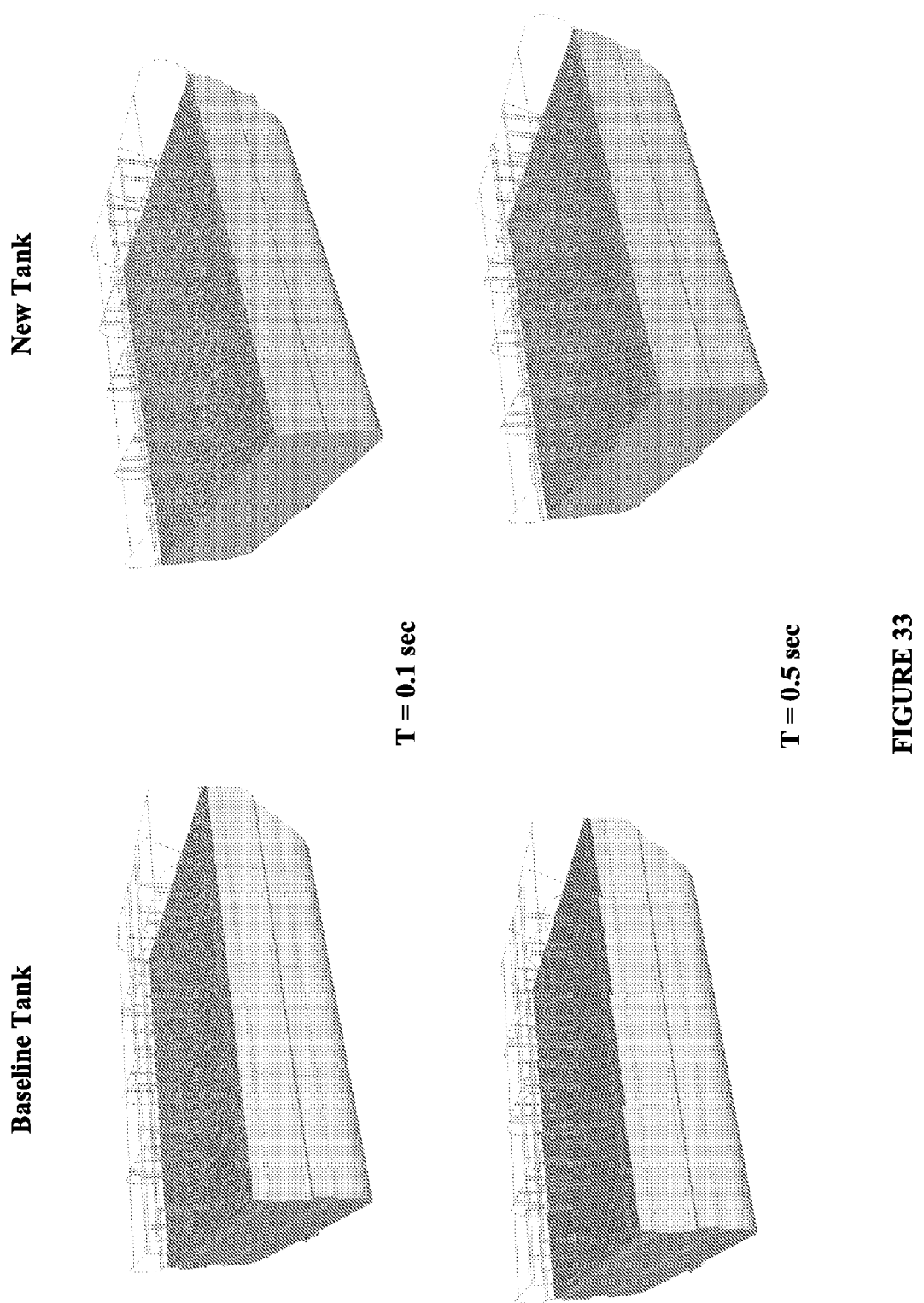
FIG. 33 depicts a picture comparing the respective longitudinal CFD simulations at time steps of 0.1 second and 0.5 seconds.
Figure 34:
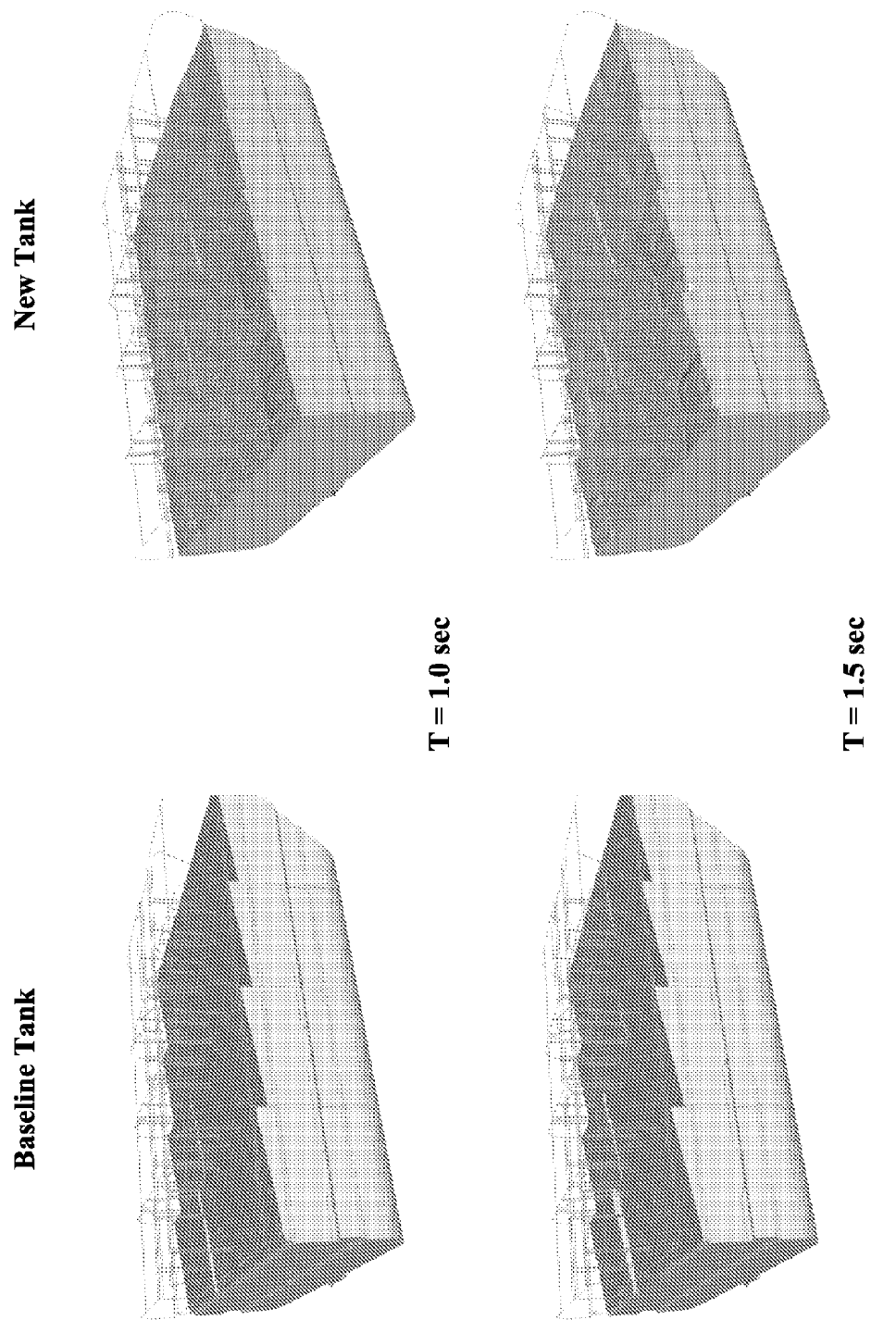
FIG. 34 depicts a picture comparing the respective transverse CFD simulations at time steps of 1.0 seconds and 1.5 seconds.

CFD simulations were also run where the baseline tank and the tank 12 of the present invention were subjected to a longitudinal, or front to back, excitation simulating the vehicle 10 braking and accelerating. FIG. 31 is a tabular comparison of this data and FIG. 32 is a graphical representation of the data. It is evident from comparing the data in FIG. 31 and FIG. 32 that the present tank 12 is more effective in controlling fluid surges than the baseline tank.

Figure 35:
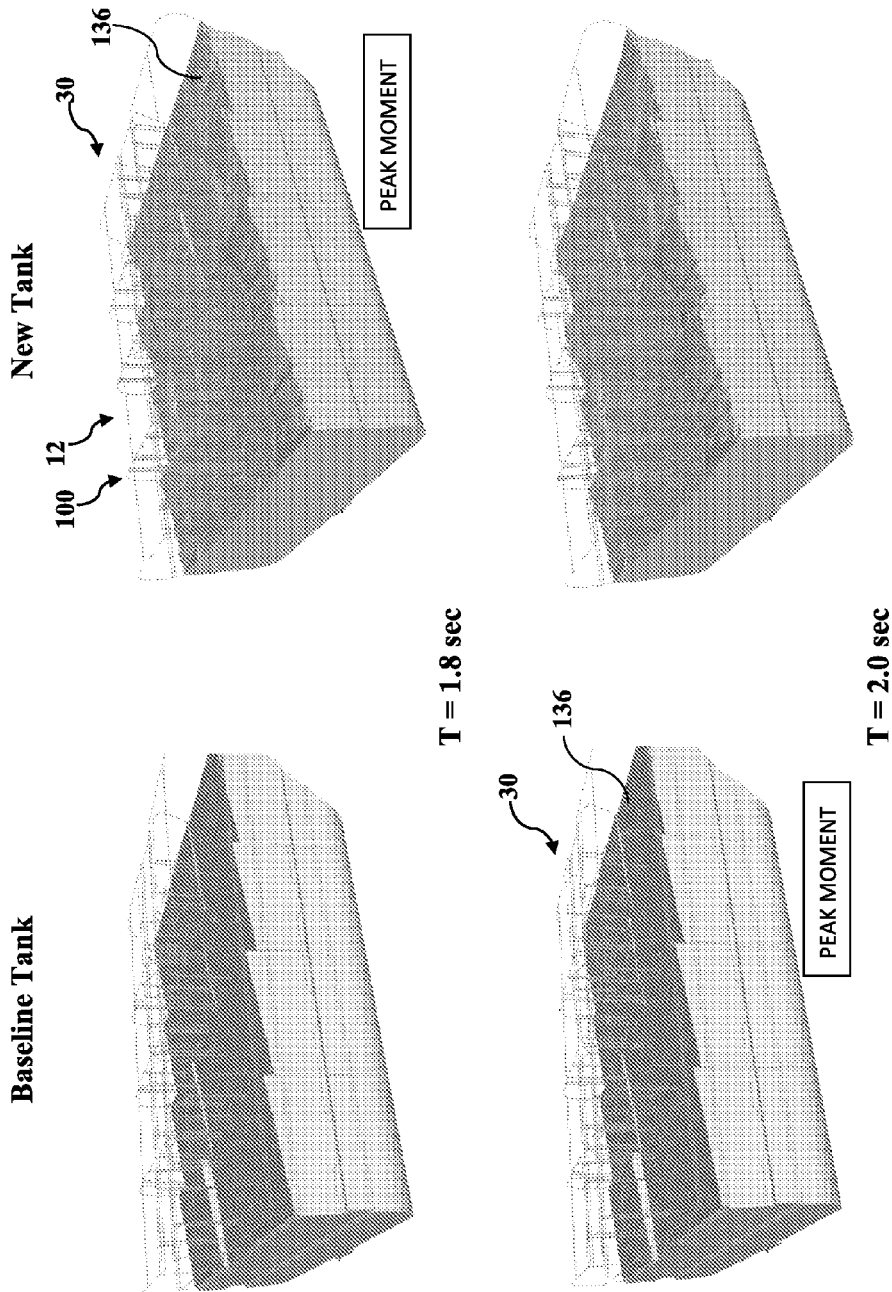
FIG. 35 depicts a picture comparing the respective transverse CFD simulations at time steps of 1.8 seconds and 2.0 seconds.
Figure 36:
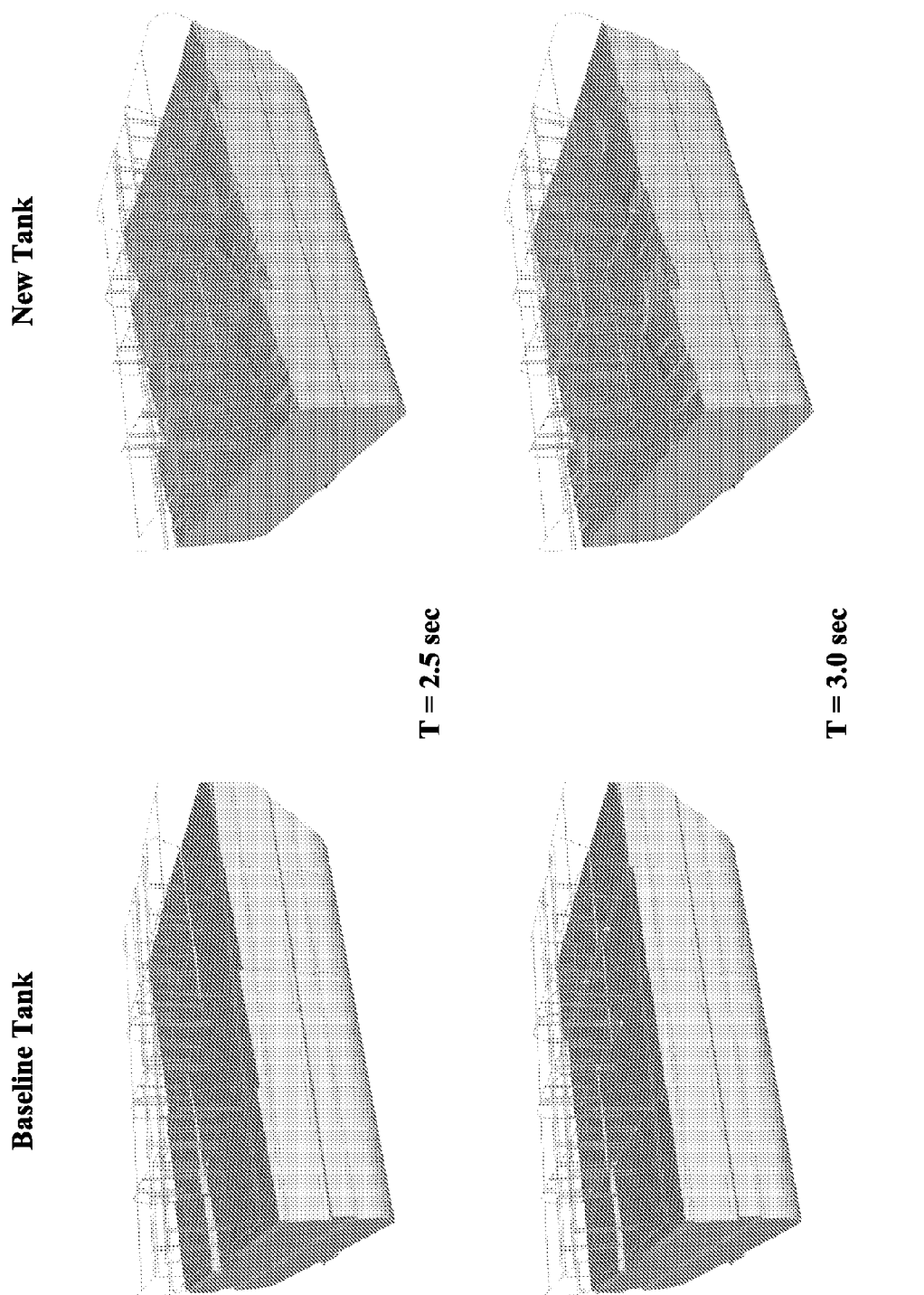
FIG. 36 depicts a picture comparing the respective transverse CFD simulations at time steps of 2.5 seconds and 3.0 seconds.
Figure 37:
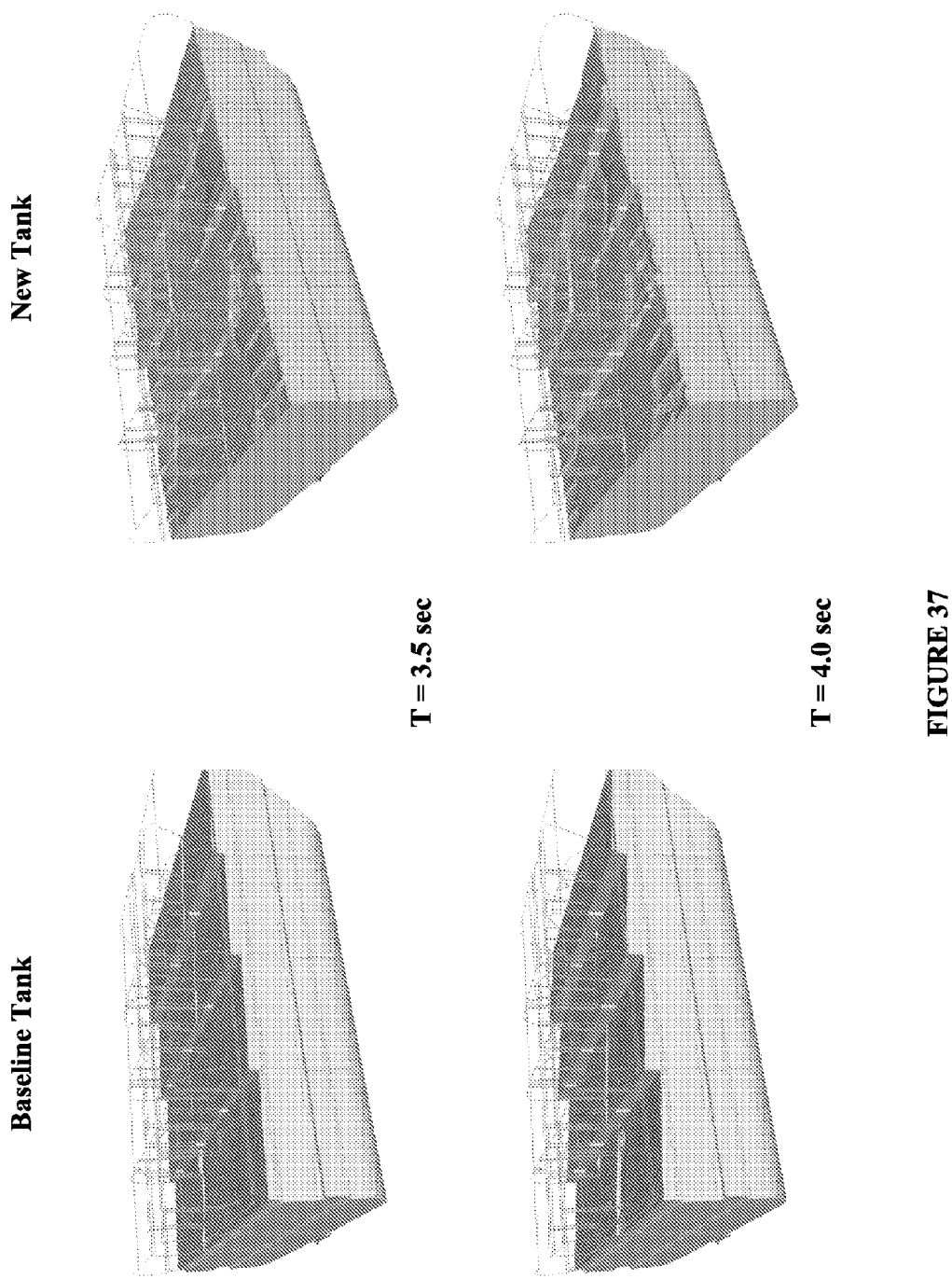
FIG. 37 depicts a picture comparing the respective transverse CFD simulations at time steps of 3.5 seconds and 4.0 seconds.

FIGS. 33 through 39 are snapshots showing the fluid reactions at the various time steps of the simulation as the fluid surges from front to back in the respective tanks. FIG. 35 shows the time steps where each respective tank simulation produces peak moments as a result of the fluid surge 136 towards the front bulkhead 30 of the tank 12. The tank 12 shows lower moments than the baseline tank when subjected to the longitudinal forces as the baffle system 100 prevents the fluid surge 136 from rushing as far up the front bulkhead 30 as the baseline tank.

Figure 38:
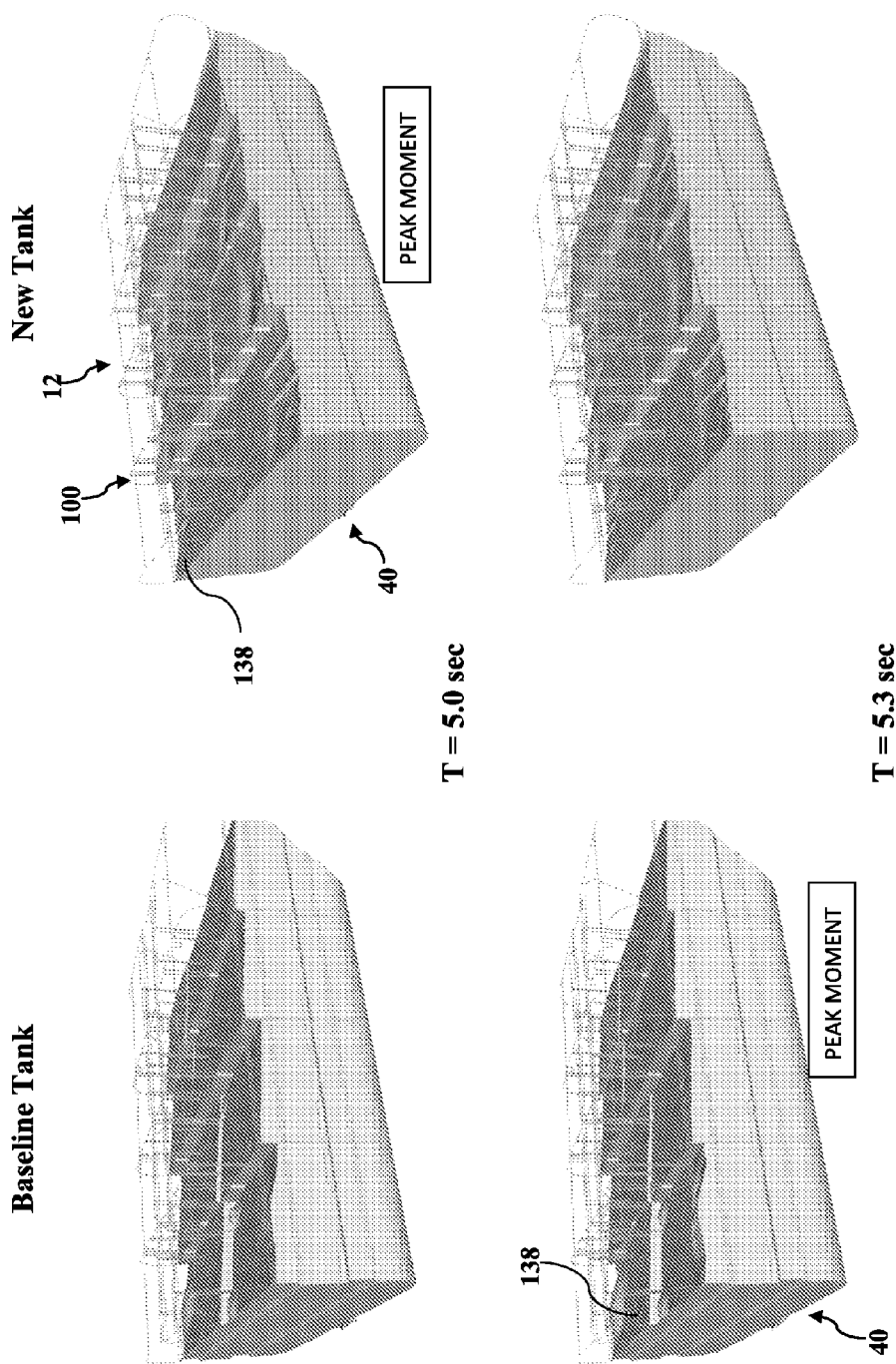
FIG. 38 depicts a picture comparing the respective transverse CFD simulations at time steps of 5.0 seconds and 5.3 seconds.
Figure 39:
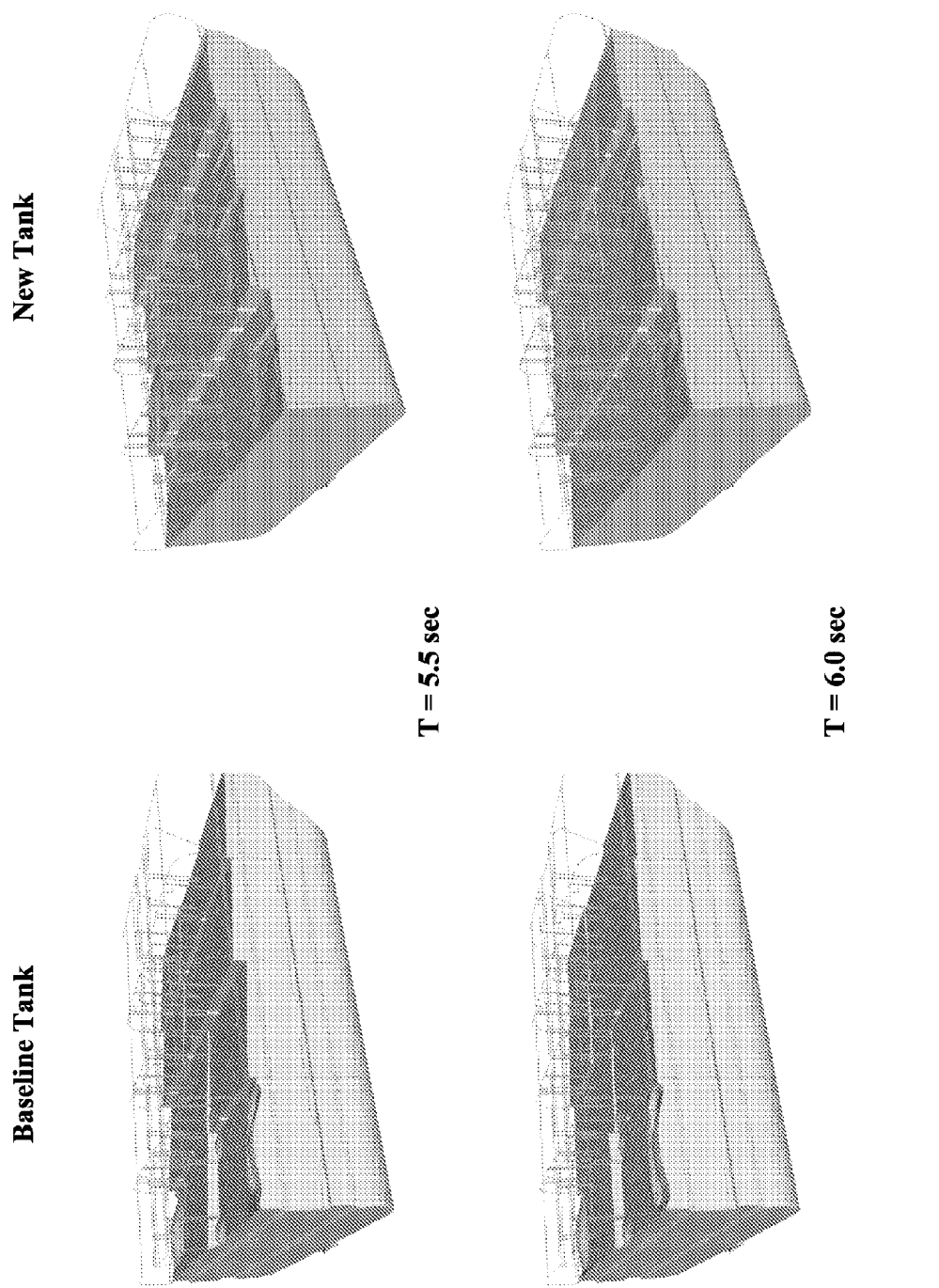
FIG. 39 depicts a picture comparing the respective transverse CFD simulations at time steps of 5.5 seconds and 6.0 seconds.

FIG. 38 shows the time steps where each respective tank simulation produces peak moments as a result of the fluid surge 138 returning towards the rear bulkhead 40 of the tank 12. The tank 12 shows lower moments than the baseline tank when subjected to the longitudinal forces because the baffle system 100 prevents the fluid surge 138 from rushing as far up the rear bulkhead 40 as in the baseline tank. Although the vehicle 10 is less likely to flip over end to end than it is to roll over side-ways, the tank 12 further reduces the chances of the vehicle 10 flipping end to end by more effectively controlling fluid surges in the longitudinal direction. It is evident from the CFD simulation results that the baffle system 100 within the tank 12 is more effective controlling fluid motion in the transverse and longitudinal directions than the baseline tank, resulting in a safer vehicle 10 to operate.

Thus, the present tank is mountable on a truck chassis to transport fluids. The tank includes a transversely extending front bulkhead set at a predetermined angle to fit the truck chassis on which the tank is to be mounted, a plurality of opposed longitudinally extending side plates welded to the front bulkhead and to a transversely extending rear bulkhead, and a longitudinally extending floor and a longitudinally extending top welded to the front bulkhead, to the rear bulkhead, and to each of the side plates, the top, floor, side plates and front and rear bulkheads thereby forming an interior of the tank. A plurality of ventilation ports are formed in the front bulkhead and the rear bulkhead. Fans may be mounted to the exterior of the ventilation ports to assist in ventilating the interior of the tank and to circulate fresh air through the tank to keep air quality within acceptable regulation requirements and to mitigate hazardous atmospheric conditions from occurring within the tank.

A baffle system is used to control fluid surge in the longitudinal, transverse, or vertical direction during transport of the tank. The baffle system includes a plurality of interlocking longitudinal baffles and transverse baffles in the interior that extend generally from the floor to the top of the tank interior. One or more of the baffles may be formed to increase strength and stiffness and to reduce the need to attach additional structural members for reinforcement and stiffening to the baffle. One or more horizontal baffles are located at different elevations from the floor and extend into the interior of the tank. The horizontal baffles may be affixed to the tank sides, the front bulkhead, and the rear bulkhead.

A plurality of baffle openings in the longitudinal and transverse baffles permit access to compartments formed by the interlocking baffles. The openings are generally aligned to permit a direct line of sight with unimpeded travel corridors as a person moves in the longitudinal or in the transverse direction inside the interior. The baffle openings are of a size so that a person of average stature may freely pass through each baffle opening without excessive or significant climbing, crawling, scrambling, twisting, or bending.

A fill port is formed in the top of the tank through which the interior may be filled with water or other fluid. The fill port further has plates and hinged access covers to assist in fluid containment, splash back reduction, debris filtration, and fall protection. The fill port plates may include a safety guardrail and a handrail.

The fill port is located at an upper end of a staircase that descends into the interior from the top of the tank to the floor to provide access from the top through the fill port and to the floor of the tank. The staircase permits walking access from the top of the tank down to the floor of the tank. The staircase has a plurality of steps and kick plates and a handrail descends into the interior alongside the staircase. The steps may be formed from an open grating material to allow fluid to pass through the steps and promote filling of the tank. The kick plates may be formed from a solid material to provide structural support for the steps. The steps and plates thereby adapted to assist in controlling fluid surge.

The tank may also include various other items, such as an external ladder 90 or external stairway 160 to provide access from the chassis to the top of the tank, a walkway constructed of non-slip materials with a plurality of safety guardrails affixed to the top of the tank between the external ladder and the staircase located in the fill port, a plurality of safety rails around the top of the tank to provide a working platform, a water dam to direct over-fill or spillage off to the sides of the tank and prevent fluid from spilling onto the chassis, a sump trough formed in the floor to direct fluid into pump and spray systems of the tank, and mounting brackets to pivotally connect the tank to the chassis.

Although the embodiments discussed in this disclosure involve a specific design for a tank, a tank having more or less baffles or a different stairway configuration would also provide similar advantages. Thus, the present designs may also be useful for tanks used in other applications, such as a drop-in tank that is removably mounted on a truck body, or a tank that may be used as a stationary tank. Therefore, the present invention has several advantages. Although embodiments of the present invention have been described, various modifications and changes may be made by those skilled in the art without departing from the spirit and scope of the invention.

The invention claimed is:

1. A tank for a truck chassis for the containment and transport of fluids, the tank comprising:
    a transversely extending front bulkhead set at a predetermined angle to fit the truck chassis on which the tank is to be mounted;
    a plurality of opposed longitudinally extending side plates affixed to the front bulkhead and to a transversely extending rear bulkhead;
    a longitudinally extending floor and a longitudinally extending top affixed to the front bulkhead, to the rear bulkhead, and to each of the side plates, the top, floor, side plates and front and rear bulkheads thereby forming an interior of the tank;
    a plurality of ventilation ports in the front bulkhead and the rear bulkhead, the ventilation ports adaptable to mount circulation fans to assist in ventilating the interior of the tank;
    a baffle system adapted to control fluid surge in at least one of the longitudinal, transverse, or vertical directions, the baffle system including:
    a plurality of interlocking longitudinal baffles and transverse baffles in the interior extending generally from the floor to the top, at least one of the baffles formed to increase strength and stiffness and to reduce the need to attach additional structural members for reinforcement and stiffening to the baffle;
    a plurality of horizontal baffles located at different elevations from the floor and extending into the interior of the tank, at least one horizontal baffle affixed to each of the side plates, the front bulkhead, and the rear bulkhead; and
    a plurality of baffle openings in the longitudinal and transverse baffles to allow access to compartments formed by the interlocking baffles, the openings being generally aligned to provide a direct line of sight with unimpeded travel corridors as one moves in the longitudinal or in the transverse direction inside the interior, the baffle openings being sized so that a person of average stature may freely pass through each baffle opening without excessive climbing, crawling, scrambling, twisting, or bending;
    a fill port in the top through which the interior may be filled with fluid, the fill port having a plurality of plates and hinged access covers that are adapted to assist in fluid containment, splash back reduction, debris filtration, and fall protection, the fill port being located at an upper end of a staircase that descends into the interior from the top of the tank to the floor to provide access from the top through the fill port and to the floor of the tank, the staircase having a plurality of steps and kick plates and the staircase adapted to allow walking access from the top of the tank down to the floor of the tank, each of the steps being formed from an open grating material to allow fluid to pass through the steps and promote filling of the tank and each of the kick plates being formed from a solid material to provide structural support for the staircase, the steps and plates thereby adapted to assist in controlling fluid surge; and
    at least one handrail that descends into the interior alongside the staircase.

2. The tank of claim 1 in which the fill port plates further comprise at least one of a safety guardrail and a handrail.

3. The tank of claim 1 further comprising:
    an external ladder to provide access to the top of the tank;
    a walkway constructed of non-slip materials with a plurality of safety guardrails affixed to the top of the tank between the external ladder and the staircase located in the fill port;
    a plurality of safety rails around the top of the tank to provide a working platform;
    a fluid dam to direct over-fill or spillage off to the sides of the tank and prevent fluid from spilling onto the chassis;
    a sump trough formed in the floor to direct fluid into pump and spray systems of the tank; and
    mounting brackets to pivotally connect the tank to the chassis.

4. The tank of claim 1 further comprising a ventilation system having fans attachable to the ventilation ports in the front bulkhead and rear bulkhead, the ventilation fans adapted to circulate fresh air through the tank to keep air quality within acceptable regulation requirements and to mitigate hazardous atmospheric conditions from occurring within the tank.

5. A tank for the containment and transport of fluids comprising:
    transverse front and rear bulkheads;
    a plurality of opposed longitudinally extending side plates affixed to the front and rear bulkheads;
    a longitudinally extending floor and a longitudinally extending top affixed to the front bulkhead, to the rear bulkhead, and to each of the side plates, the top, floor, side plates and front and rear bulkheads thereby forming an interior of the tank, the interior defining a width of the tank;
    a fill port in the top through which the interior may be filled with fluid, the fill port being located at an upper end of a staircase that descends into the interior of the tank to provide walking access from the top through the fill port and to the floor of the tank;
    a baffle system adapted to control fluid surge in at least one of the longitudinal, transverse, or vertical directions, the baffle system comprising:
    at least one longitudinal baffle in the interior of the tank;
    at least one transverse baffle in the interior of the tank;
    at least one substantially horizontal baffle that extends into the interior of the tank a distance of at least 15% of the width of the tank; and
    a baffle opening in at least one of the longitudinal and transverse baffles, the baffle opening sized so that a person of average stature may freely pass therethrough.

6. The tank of claim 5 wherein:
    the at least one longitudinal baffle comprises a plurality of longitudinal baffles;
    the at least one transverse baffle comprises a plurality of transverse baffles;
    the longitudinal baffles and the transverse baffles form a plurality of interlocking longitudinal baffles and transverse baffles in the interior extending generally from the floor to the top, at least one of the baffles formed to increase strength and stiffness and to reduce the need to attach additional structural members for reinforcement and stiffening to the baffle;
    the at least one horizontal baffle further comprises a plurality of substantially horizontal baffles located at different elevations from the floor and extending into the interior of the tank, at least one of the plurality of horizontal baffles affixed to each of the side plates, the front bulkhead, and the rear bulkhead; and
    the baffle opening further comprises a plurality of baffle openings in the longitudinal and transverse baffles to allow access to compartments formed by the interlocking baffles, the plurality of baffle openings being generally aligned to provide a direct line of sight with unimpeded travel corridors as one moves in the longitudinal or in the transverse direction inside the interior, the plurality of baffle openings being sized so that a person of average stature may freely pass through each baffle opening without excessive climbing, crawling, scrambling, twisting, or bending.

7. The tank of claim 5 further comprising a second fill port located in the top.

8. The tank of claim 5 in which the fill port further comprises a plurality of plates and hinged access covers adapted to assist in fluid containment, splash back reduction, debris filtration, and fall protection.

9. The tank of claim 8 in which the fill port plates further comprise at least one of a safety guardrail and a handrail.

10. The tank of claim 5 further comprising at least one access door formed in one of the front bulkhead, the rear bulkhead, and one of the side plates.

11. The tank of claim 5 further comprising a plurality of vent holes in the top of the tank.

12. The tank of claim 5 in which the tank is adapted to be removably mounted on a truck body.

13. The tank of claim 5 in which the staircase comprises a plurality of steps and kick plates adapted to assist in controlling fluid surge.

14. The tank of claim 13 in which the steps are formed from an open grating material to allow fluid to pass through the steps and promote filling of the tank and the kick plates are formed from a solid material to provide structural support for the staircase.

15. The tank of claim 13 in which the kick plates are formed from an open grating material to allow fluid to pass through the kick plates and promote filling of the tank and the steps are formed from a solid material to provide structural support for the staircase.

16. The tank of claim 5 further comprising at least one handrail that descends into the interior alongside the staircase.

17. The tank of claim 5 in which the staircase is adapted to be removed from the interior of the tank.

18. The tank of claim 5 in which the staircase is affixed to the interior of the tank.

19. The tank of claim 5 in which the staircase is formed in one of the front bulkhead, the rear bulkhead, and one of the side plates.

20. The tank of claim 5 further comprising at least one ventilation port in at least one of the front bulkhead and the rear bulkhead, the ventilation port adaptable to mount a circulation fan to assist in ventilating the interior of the tank.

21. A tank for the containment of liquids comprising:
    transverse front and rear bulkheads;
    a plurality of opposed longitudinally extending side plates affixed to the front and rear bulkheads;
    a longitudinally extending floor and a longitudinally extending top affixed to the front bulkhead, to the rear bulkhead, and to each of the side plates, the top, floor, side plates and front and rear bulkheads thereby forming an interior of the tank; and
    a port in the top located at an upper end of a staircase that descends into the interior of the tank to provide walking access from the top through the port and to the floor of the tank, the port configured to act as a fill port through which the interior may be filled with fluid, and the port further comprising a plurality of plates and hinged access covers adapted to assist in fluid containment, splash back reduction, debris filtration, and fall protection.

22. The tank of claim 21 in which the staircase is adapted to be removed from the interior of the tank.

23. The tank of claim 21 in which the staircase is affixed to the interior of the tank.

24. The tank of claim 21 in which the staircase is formed in one of the front bulkhead, the rear bulkhead, and one of the side plates.

25. The tank of claim 21 wherein the port is a first fill port and the tank further comprises a second fill port located in the top.

26. The tank of claim 21 further comprising at least one access door formed in one of the front bulkhead, the rear bulkhead, and one of the side plates.

27. The tank of claim 21 further comprising a plurality of vent holes in the top of the tank.

28. The tank of claim 21 in which the tank is adapted to be removeably mounted on a truck body.

29. The tank of claim 21 further comprising at least one ventilation port in at least one of the front bulkhead and the rear bulkhead, the ventilation ports adaptable to mount circulation fans to assist in ventilating the interior of the tank.

30. The tank of claim 21 further comprising a baffle system in the interior of the tank adapted to control fluid surge in the longitudinal, transverse, or vertical direction.

31. The tank of claim 30 in which the baffle system further comprises:
  at least one longitudinal baffle in the interior of the tank;
  at least one transverse baffle in the interior of the tank;
  at least one horizontal baffle in the interior of the tank; and
  a baffle opening in at least one of the longitudinal and transverse baffles, the baffle opening sized so that a person of average stature may freely pass therethrough.

32. The tank of claim 30 in which the baffle system further comprises:
  a plurality of interlocking longitudinal baffles and transverse baffles in the interior extending generally from the floor to the top, at least one of the baffles formed to increase strength and stiffness and to reduce the need to attach additional structural members for reinforcement and stiffening to the baffle;
  a plurality of horizontal baffles located at different elevations from the floor and extending into the interior of the tank, at least one horizontal baffle affixed to each of the side plates, the front bulkhead, and the rear bulkhead; and
  a plurality of baffle openings in the longitudinal and transverse baffles to allow access to compartments formed by the interlocking baffles, the openings being generally aligned to provide a direct line of sight with unimpeded travel corridors as one moves in the longitudinal or in the transverse direction inside the interior, the baffle openings being sized so that a person of average stature may freely pass through each baffle opening without excessive climbing, crawling, scrambling, twisting, or bending.

33. The tank of claim 21 in which the port plates further comprise at least one of a safety guardrail and a handrail.

34. The tank of claim 21 in which the staircase comprises a plurality of steps and kick plates adapted to assist in controlling fluid surge.

35. The tank of claim 34 in which the steps are formed from an open grating material to allow fluid to pass through the steps and promote filling of the tank and the kick plates are formed from a solid material to provide structural support for the staircase.

36. The tank of claim 34 in which the kick plates are formed from an open grating material to allow fluid to pass through the kick plates and promote filling of the tank and the steps are formed from a solid material to provide structural support for the staircase.

37. The tank of claim 21 further comprising at least one handrail that descends into the interior alongside the staircase.

38. The tank of claim 21 further comprising an external access opening directly in line with the stairway to provide walking access to the exterior of the tank.

39. A tank for the containment of liquids comprising:
  transverse front and rear bulkheads;
  a plurality of opposed longitudinally extending side plates affixed to the front and rear bulkheads;
  a longitudinally extending floor and a longitudinally extending top affixed to the front bulkhead, to the rear bulkhead, and to each of the side plates, the top, floor, side plates and front and rear bulkheads thereby forming an interior of the tank;
  a port in the top located at an upper end of a staircase that descends into the interior of the tank to provide walking access from the top through the port and to the floor of the tank; and
  a baffle system in the interior of the tank adapted to control fluid surge in the longitudinal, transverse, or vertical direction.

40. The tank of claim 39 in which the staircase is adapted to be removed from the interior of the tank.

41. The tank of claim 39 in which the staircase is affixed to the interior of the tank.

42. The tank of claim 39 in which the staircase is formed in one of the front bulkhead, the rear bulkhead, and one of the side plates.

43. The tank of claim 39 wherein the port is a first fill port and the tank further comprises a second fill port located in the top.

44. The tank of claim 39 further comprising at least one access door formed in one of the front bulkhead, the rear bulkhead, and one of the side plates.

45. The tank of claim 39 further comprising a plurality of vent holes in the top of the tank.

46. The tank of claim 39 in which the tank is adapted to be removeably mounted on a truck body.

47. The tank of claim 39 further comprising at least one ventilation port in at least one of the front bulkhead and the rear bulkhead, the ventilation ports adaptable to mount circulation fans to assist in ventilating the interior of the tank.

48. The tank of claim 39 in which the baffle system further comprises:
  at least one longitudinal baffle in the interior of the tank;
  at least one transverse baffle in the interior of the tank;
  at least one horizontal baffle in the interior of the tank; and
  a baffle opening in at least one of the longitudinal and transverse baffles, the baffle opening sized so that a person of average stature may freely pass therethrough.

49. The tank of claim 39 in which the baffle system further comprises:
  a plurality of interlocking longitudinal baffles and transverse baffles in the interior extending generally from the floor to the top, at least one of the baffles formed to increase strength and stiffness and to reduce the need to attach additional structural members for reinforcement and stiffening to the baffle;
  a plurality of horizontal baffles located at different elevations from the floor and extending into the interior of the tank, at least one horizontal baffle affixed to each of the side plates, the front bulkhead, and the rear bulkhead; and
  a plurality of baffle openings in the longitudinal and transverse baffles to allow access to compartments formed by the interlocking baffles, the openings being generally aligned to provide a direct line of sight with unimpeded travel corridors as one moves in the longitudinal or in the transverse direction inside the interior, the baffle openings being sized so that a person of average stature may freely pass through each baffle opening without excessive climbing, crawling, scrambling, twisting, or bending.

50. The tank of claim 39 in which the port acts as a fill port through which the interior may be filled with fluid.

51. The tank of claim 39 in which the port further comprises a plurality of plates and hinged access covers adapted to assist in fluid containment, splash back reduction, debris filtration, and fall protection.

52. The tank of claim 51 in which the port plates further comprise at least one of a safety guardrail and a handrail.

53. The tank of claim 39 in which the staircase comprises a plurality of steps and kick plates adapted to assist in controlling fluid surge.

54. The tank of claim 53 in which the steps are formed from an open grating material to allow fluid to pass through the steps and promote filling of the tank and the kick plates are formed from a solid material to provide structural support for the staircase.

55. The tank of claim 53 in which the kick plates are formed from an open grating material to allow fluid to pass through the kick plates and promote filling of the tank and the steps are formed from a solid material to provide structural support for the staircase.

56. The tank of claim 39 further comprising at least one handrail that descends into the interior alongside the staircase.

57. The tank of claim 39 further comprising an external access opening directly in line with the stairway to provide walking access to the exterior of the tank.

\* \* \* \* \*